US009837097B2

(12) United States Patent
Sugiyama

(10) Patent No.: US 9,837,097 B2
(45) Date of Patent: Dec. 5, 2017

(54) SINGLE PROCESSING METHOD, INFORMATION PROCESSING APPARATUS AND SIGNAL PROCESSING PROGRAM

(75) Inventor: Akihiko Sugiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 596 days.

(21) Appl. No.: 13/698,345

(22) PCT Filed: May 13, 2011

(86) PCT No.: PCT/JP2011/061597

§ 371 (c)(1), (2), (4) Date: Nov. 16, 2012

(87) PCT Pub. No.: WO2011/148860

PCT Pub. Date: Dec. 1, 2011

(65) Prior Publication Data

US 2013/0064392 A1 Mar. 14, 2013

(30) Foreign Application Priority Data

May 24, 2010 (JP) ................................ 2010-118842

(51) Int. Cl.
*H04B 15/00* (2006.01)
*G10L 21/0208* (2013.01)

(52) U.S. Cl.
CPC ................................ *G10L 21/0208* (2013.01)

(58) Field of Classification Search
CPC .. G10L 21/0208; G10L 21/0232; G10L 25/93
USPC ... 381/57, 66, 71.1, 83, 92, 94.1, 94.2, 94.3, 381/94.4, 94.5, 94.6, 94.7, 94.8, 94.9, 96, 381/106, 107, 108
See application file for complete search history.

(56) References Cited

U.S. PATENT DOCUMENTS

| | | | | |
|---|---|---|---|---|
| 5,749,068 A | 5/1998 | Suzuki | | |
| 6,418,228 B1 * | 7/2002 | Terai | G10K 11/1784 | 381/71.11 |
| 6,519,559 B1 | 2/2003 | Sirivara | | |
| 8,189,766 B1 * | 5/2012 | Klein | H04M 9/085 | 379/406.07 |
| 8,370,139 B2 * | 2/2013 | Akamine | G10L 15/20 | 704/226 |
| 8,798,992 B2 * | 8/2014 | Gay | G10L 21/028 | 381/107 |

(Continued)

FOREIGN PATENT DOCUMENTS

| | | |
|---|---|---|
| EP | 2579255 A1 | 4/2013 |
| JP | 8-221092 A | 8/1996 |

(Continued)

OTHER PUBLICATIONS

Ego, Ego Noise Suppression of a Robot Using Template Subtraction, p. 200-202.*

(Continued)

*Primary Examiner* — William A Jerez Lora
(74) *Attorney, Agent, or Firm* — Sughrue Mion, PLLC

(57) ABSTRACT

A signal processing method includes: analyzing a noisy signal that is supplied as an input signal; generating mixed noise information by mixing a plurality of noise information about a noise to be suppressed based on the result of said analysis of the noisy signal; and suppressing the noise using the mixed noise information.

19 Claims, 19 Drawing Sheets

(56) References Cited

U.S. PATENT DOCUMENTS

| | | | | |
|---|---|---|---|---|
| 2003/0179888 | A1 | 9/2003 | Burnett et al. | |
| 2005/0058301 | A1 | 3/2005 | Brown | |
| 2007/0260455 | A1* | 11/2007 | Akamine | G10L 15/20 704/233 |
| 2007/0276662 | A1* | 11/2007 | Akamine | G10L 15/065 704/233 |
| 2009/0129610 | A1* | 5/2009 | Kim | G10K 11/178 381/94.7 |
| 2010/0110231 | A1* | 5/2010 | Funabashi | H04N 5/361 348/234 |

FOREIGN PATENT DOCUMENTS

| | | | |
|---|---|---|---|
| JP | 9-258768 | A | 10/1997 |
| JP | 2002-236497 | A | 8/2002 |
| JP | 2003-284181 | A | 10/2003 |
| JP | 2006-279185 | A | 10/2006 |
| JP | 2008-203879 | A | 9/2008 |
| JP | 4282227 | B2 | 6/2009 |
| WO | 9710586 | A1 | 3/1997 |
| WO | 2010033387 | A2 | 3/2010 |

OTHER PUBLICATIONS

Extended European Search Report dated May 30, 2014, issued by the European Patent Office in corresponding European Application No. 11786559.2.

M. Berouti, et al., "Enhancement of Speech Corrupted by Acoustic Noise," Proceedings of ICASSP'79, Apr. 1979, pp. 208-211.

Communication dated Jul. 14, 2015, issued by the Japanese Patent Office in counterpart Application No. 2012517234.

Kazuhiro Nakadai, "Ego Noise Suppression of a Robot Using Template Subtraction", The 2009 IEEE/RSJ International Conference on Intelligent Robots and Systems Oct. 11-15, 2009 St. Louis, USA, 199-204 (Oct. 15, 2009), [Retrieval day Jun. 30, 2015], URL, http://www.researchgate.net/publication/224091062 Ego Noise Suppression of a Robot Using Template Subtraction.

* cited by examiner

SINGLE PROCESSING METHOD, INFORMATION PROCESSING APPARATUS AND SIGNAL PROCESSING PROGRAM

CROSS REFERENCE TO RELATED APPLICATIONS

This application is a National Stage of International Application No. PCT/JP2011/061597 filed May 13, 2011, claiming priority based on Japanese Patent Application No. 2010-118842 filed May 24, 2010, the contents of all of which are incorporated herein by reference in their entirety.

TECHNICAL FIELD

The present invention relates to a signal processing technique of suppressing noise in a noisy signal to enhance a target signal.

BACKGROUND ART

A noise suppressing technology is known as a signal processing technology of suppressing noise in a noisy signal (a signal containing a mixture of a target signal and noise) partially or entirely and outputting an enhanced signal (a signal obtained by enhancing a target signal). For example, a noise suppressor is a system that suppresses noise superposed on a target audio signal. The noise suppressor is used in various audio terminals such as mobile phones.

Concerning technologies of this kind, patent literature 1 discloses a method of suppressing noise by multiplying an input signal by a suppression coefficient smaller than 1. Patent literature 2 discloses a method of suppressing noise by directly subtracting estimated noise from a noisy signal.

The techniques described in patent literature 1 and 2 need to estimate noise from the target signal that has already become noisy due to the mixed noise. However, there are limitations on accurately estimating noise only from the noisy signal. Hence, generally, the methods disclosed in patent literature 1 and 2 are effective only when noise is much smaller than a target signal. If the condition that the noise is sufficiently smaller than the target signal is not satisfied, accuracy of a noise estimation value is poor. For this reason, the methods disclosed in patent literature 1 and 2 can achieve no sufficient noise suppression effect, and the enhanced signal includes a large distortion.

On the other hand, patent literature 3 discloses a noise suppression system that can realize enough noise suppression effect and small distortion in the enhanced signal even if the condition that the noise is sufficiently smaller than the target signal is not satisfied. Assuming that the characteristics of noise to be mixed into the target signal are known to some extent in advance, the method disclosed in patent literature 3 suppresses the noise by subtracting noise information (information about the noise characteristics) which is recorded in advance from the noisy signal. Patent literature 3 also discloses a method of multiplying the noise information by a large coefficient if input signal power obtained by analyzing an input signal is large; or a small coefficient if the input signal power is small, and subtracting the multiplication result from the noisy signal.

CITATION LIST

Patent Literature

[PLT 1] Japanese Patent Publication No. 4282227
[PLT 2] Japanese Patent Application Laid-Open No. 1996-221092
[PLT 3] Japanese Patent Application Laid-Open No. 2006-279185

SUMMARY OF INVENTION

However, the method disclosed in patent literature 3 described above performs noise removal using only one noise characteristic for one kind of noise. Therefore, in this method, types of noise that can be suppressed are limited. For this reason, the method cannot cope with highly nonstationary signal characteristics such as a case including impact noise, and a case including peaks in the spectrum.

In consideration of the above, the object of the present invention is to provide a signal processing technology which settles the above-mentioned problems.

In order to achieve the above-mentioned object, a method according to the present invention includes: analyzing a noisy signal that is supplied as an input signal; generating mixed noise information by mixing a plurality of noise information about a noise to be suppressed based on the result of said analysis of the noisy signal; and suppressing the noise using said mixed noise information.

In order to achieve the above-mentioned object, an apparatus according to the present invention includes: an analysis means for analyzing a noisy signal that is supplied as an input signal; a mixing means for mixing a plurality of noise information about a noise to be suppressed according to the result of said analysis of the noisy signal to generate mixed noise information; and a noise suppression means for suppressing the noise using said mixed noise information.

In order to achieve the above-mentioned object, a program stored in a program recording medium according to the present invention makes a computer execute: an analysis step for analyzing a noisy signal that is supplied as an input signal; a mixing step for mixing a plurality of noise information about a noise to be suppressed according to the result of said analysis of the noisy signal to generate mixed noise information; and a noise suppression step for suppressing the noise using said mixed noise information.

ADVANTAGEOUS EFFECT OF INVENTION

The present invention provides a signal processing technology which can realize noise suppression for highly nonstationary signals with many changes in their characteristics.

DESCRIPTION OF EMBODIMENTS

Hereinafter, exemplary embodiments of the present invention will be described in detail illustratively with reference to a drawing. However, components described in the following exemplary embodiments are thoroughly for illustrative purposes, and it is not our intention to limit the technological scope of the present invention to only those.

First Exemplary Embodiment

[Entire Structure]

A noise suppressing apparatus 100 will be described as the first exemplary embodiment that realizes a signal processing method according to the present invention. The noise suppressing apparatus 100 suppresses noise in a noisy signal (a signal containing a mixture of a target signal and noise) partially or entirely, and outputs an enhanced signal (a signal obtained by enhancing the target signal).

Figure 1:
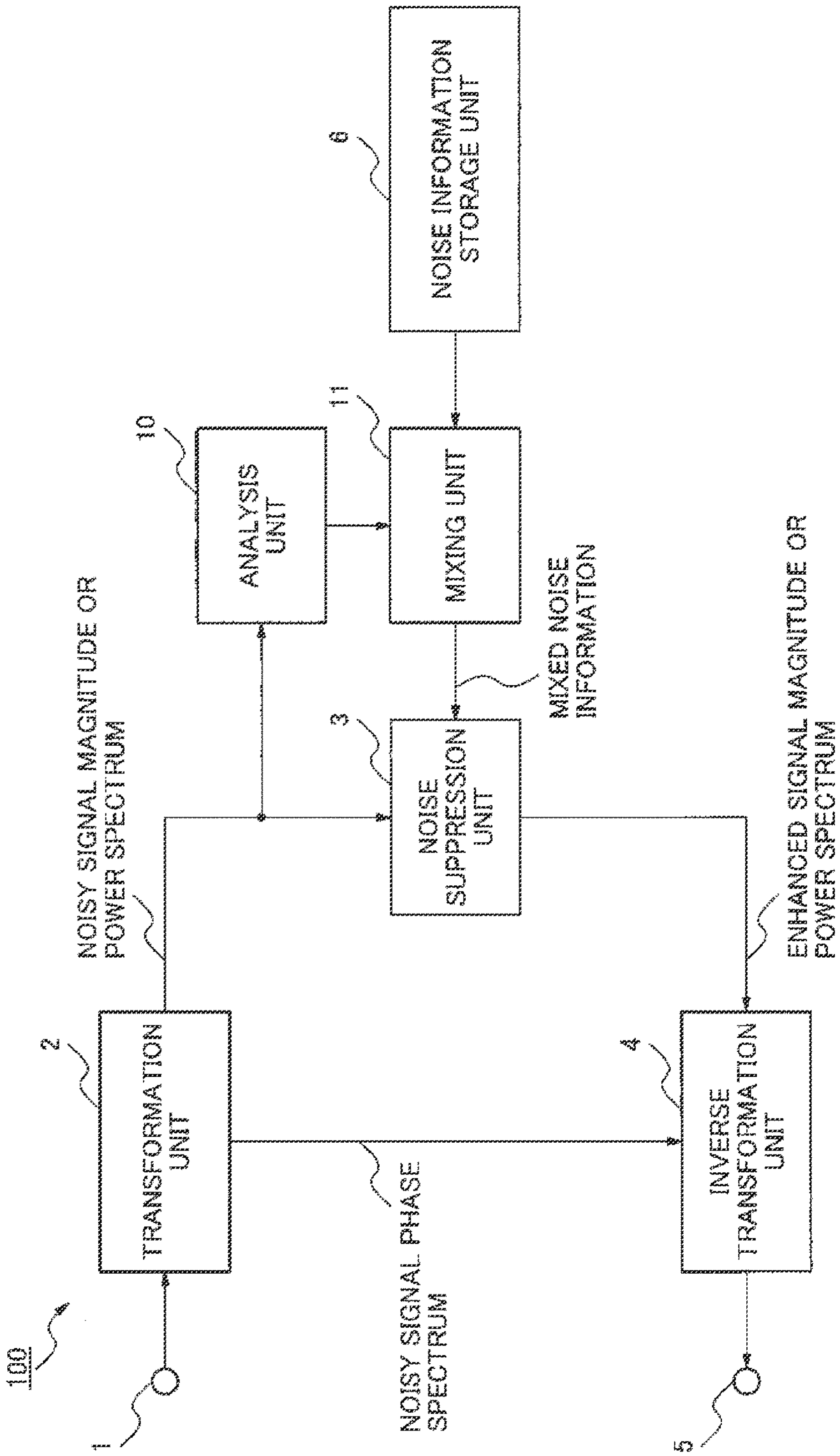
FIG. 1 is a block diagram showing a schematic configuration of a noise suppressing apparatus according to a first exemplary embodiment of the present invention.

FIG. 1 is a block diagram showing the entire structure of the noise suppressing apparatus 100. The noise suppressing apparatus 100 also functions as a part of equipment such as digital cameras, laptop computers and mobile phones, for example. However, the present invention is not limited to this, and it can be applied to all information processing devices that need removal of noise from an input signal.

As shown in FIG. 1, the noise suppressing apparatus 100 includes an input terminal 1, a transformation unit 2, a noise suppression unit 3, an inverse transformation unit 4, an output terminal 5, an analysis unit 10, a mixing unit 11 and a noise information storage unit 6. When saying it roughly, this noise suppressing apparatus 100 analyzes a noisy signal that is supplied as an input signal, generates mixed noise information (pseudo noise information) by a mixing method according to the analysis result using noise information stored in advance, and suppresses the noise using the mixed noise information. At least one of a plurality of noise information to be mixed is stored in the noise information storage unit 6 in advance.

Figure 19:
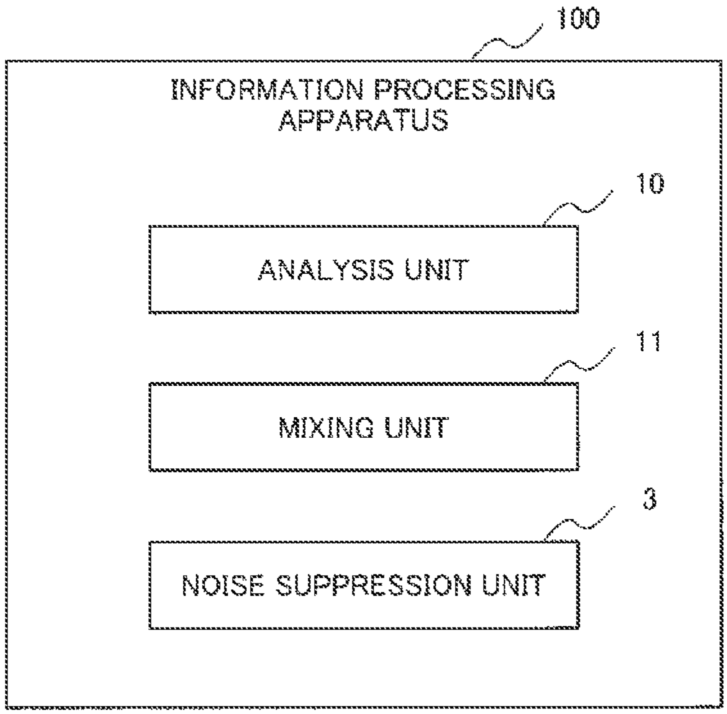
FIG. 19 is a block diagram showing a schematic configuration of an information processing apparatus of the present invention.

Another example of a block diagram of an information processing apparatus (noise suppressing apparatus) 100 is shown in FIG. 19. The information processing apparatus 100 includes the analysis unit 10, the mixing unit 11 and the noise suppression unit 3. Description will be made using FIG. 1 below.

A noisy signal is supplied to the input terminal 1 as a series of sample values. The noisy signal supplied to the input terminal 1 undergoes transformation such as Fourier transformation in the transformation unit 2 and is decomposed into a plurality of frequency components. A magnitude spectrum of a plurality of frequency components is supplied to the noise suppression unit 3, and a phase spectrum is transmitted to the inverse transformation unit 4. Meanwhile, to the noise suppression unit 3, a magnitude spectrum is supplied here. However, the present invention is not limited to this, and a power spectrum corresponding to the square of the magnitude spectrum may be supplied to the noise suppression unit 3.

The noise information storage unit 6 includes a memory device such as a semiconductor memory, and stores information on characteristics of known noise as a suppression target (noise information). For example, the known noise stored as a suppression target is such as a shutter sound, a motor-driving sound, a zooming sound and focusing noise of an automatic focusing system (a clicking sound) or the like.

On the other hand, the analysis unit 10 takes in a noisy signal magnitude spectrum generated by the transformation unit 2 and analyzes it. By analyzing the noisy signal magnitude spectrum, the analysis unit 10 determines the characteristics of the noise included in the noisy signal, and determines a mixing method of noise information conforming to the characteristics. Then, the analysis unit 10 hands the determined mixing method to the mixing unit 11.

According to the mixing method received from the analysis unit 10, the mixing unit 11 generates mixed noise information from the noise information stored in the noise information storage unit 6.

Using the noisy signal magnitude spectrum supplied from the transformation unit 2 and the mixed noise information supplied from the mixing unit 11, the noise suppression unit 3 suppresses noise in each frequency and transmits an enhanced signal magnitude spectrum as the noise suppression result to the inverse transformation unit 4.

The inverse transformation unit 4 puts the enhanced signal magnitude spectrum supplied from the noise suppression unit 3 and the phase spectrum of the noisy signal supplied from the transformation unit 2 together to perform the inverse transform, and supplies the result to the output terminal 5 as enhanced signal samples.

[Structure of Transformation Unit]

Figure 2:
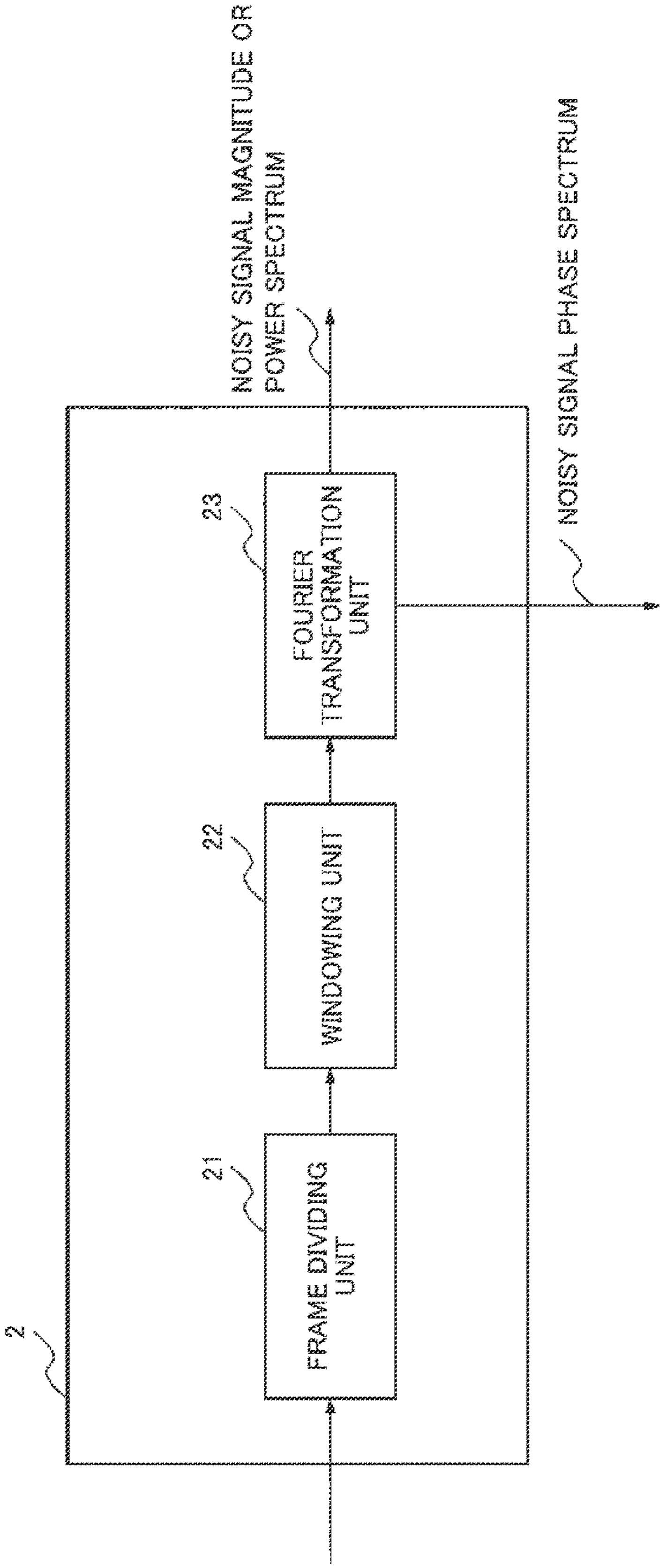
FIG. 2 is a block diagram showing a structure of a transformation unit included in a noise suppressing apparatus according to the first exemplary embodiment of the present invention.

FIG. 2 is a block diagram showing a structure of a transformation unit. As shown in FIG. 2, the transformation unit includes a frame dividing unit 21, a windowing unit 22 and a Fourier transformation unit 23.

Noisy signal samples are supplied to the frame dividing unit 21 and are divided into a frame for each K/2 samples. Here, it is supposed that K is an even number. Noisy signal samples divided into frames are supplied to the windowing unit 22, and are multiplied by w (t) which is a window function. An input signal yn (t) (t=0, 1, . . . , K/2−1) of the nth frame windowed by w (t) is given by the following Equation (1).

$$\bar{y}_n(t)=w(t)y_n(t) \tag{1}$$

Also, it is widely practiced to overlap a part of two successive frames to perform windowing. Assuming that the overlap length is 50% of the frame length, the left-hand side obtained by the following Equation (2) will be the output of the windowing unit 22 for t=0, 1, . . . , K/2−1.

$$\left.\begin{aligned}\bar{y}_n(t) &= w(t)y_{n-1}(t+K/2)\\ \bar{y}_n(t+K/2) &= w(t+K/2)y_n(t)\end{aligned}\right\} \tag{2}$$

A symmetrical window function is used for a real numbered signal. A window function is designed so that an output signal should be identical to the output signal except for a computation error when setting a suppression coefficient in MMSE STSA method to 1, or when subtracting zero in the SS method. This means that w (t)+w (t+K/2)=1.

Hereinafter, description will be continued taking a case in which windowing is performed by overlapping 50% of two successive frames as an example. As w (t), a Hanning window indicated by the following Equation (3) can be used, for example.

$$w(t)=\begin{cases}0.5+0.5\cos\left(\dfrac{\pi(t-K/2)}{K/2}\right), & 0\le t<K\\ 0, & \text{otherwise}\end{cases} \tag{3}$$

Moreover, various window functions such as Hamming window, Kaiser window and Blackman window are also known.

The output of windowing is supplied to the Fourier transformation unit 23 and is transformed into a noisy signal spectrum Yn (k). The noisy signal spectrum Yn (k) is separated into a phase and a magnitude, and a noisy signal phase spectrum arg Yn (k) is supplied to the inverse transformation unit 4 and a noisy signal magnitude spectrum |Yn (k)| is supplied to the noise suppression unit 3. As has been already described, a power spectrum may be used in place of a magnitude spectrum.

[Structure of Inverse Transformation Unit]

Figure 3:
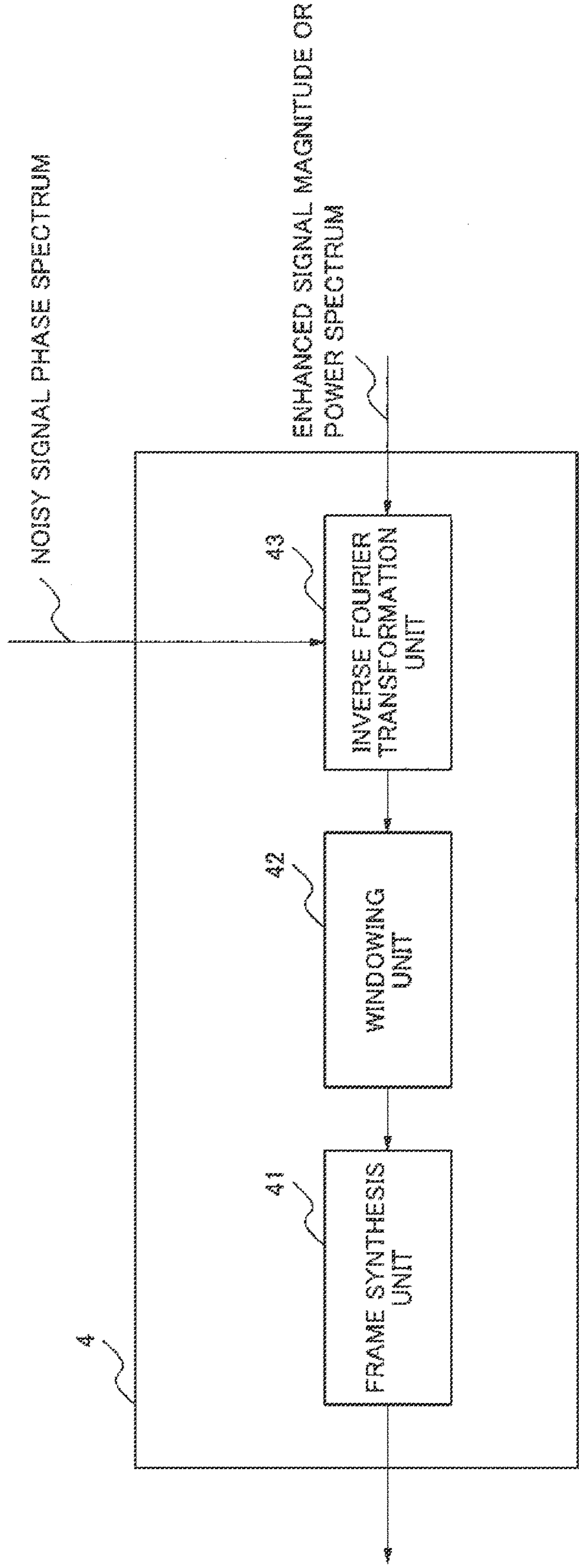
FIG. 3 is a block diagram showing a structure of an inverse transformation unit included in a noise suppressing apparatus according to the first exemplary embodiment of the present invention.

FIG. 3 is a block diagram showing a structure of the inverse transformation unit 4. As shown in FIG. 3, the inverse transformation unit 4 includes an inverse Fourier transformation unit 43, a windowing unit 42 and a frame synthesis unit 41. The inverse Fourier transformation unit 43 multiplies an enhanced signal magnitude spectrum supplied from the noise suppression unit 3 by the noisy signal phase spectrum arg Yn (k) supplied from the transformation unit 2, and obtains an enhanced signal (the left-side of the following Equation (4)).

$$\bar{X}_n(k)=|\bar{X}_n(k)|\cdot arg\ Y_n(k) \tag{4}$$

The inverse Fourier transformation unit 43 performs inverse Fourier transform of the obtained enhanced signal. The inverse Fourier transformed enhanced signal is supplied to the windowing unit 42 as a time domain sample value sequence xn(t) (t=0, 1, . . . , K−1) in which one frame includes K samples, and is multiplied by window function w (t). The signal made by windowing the input signal xn(t) (t=0, 1, . . . , K/2−1) of the nth frame by w (t) is given by the left-side of the following Equation (5).

$$\bar{x}_n(t)=w(t)x_n(t) \tag{5}$$

It is also widely practiced to perform windowing by overlapping a part of two successive frames. Assuming that 50% of the frame length is the overlap length, the left-side of the following Equation will be the output of the windowing unit 42 for t=0, 1, . . . , K/2−1, and is transmitted to the frame synthesis unit 41.

$$\left.\begin{aligned}\bar{x}_n(t) &= w(t)x_{n-1}(t+K/2)\\ \bar{x}_n(t+K/2) &= w(t+K/2)x_n(t)\end{aligned}\right\} \tag{6}$$

The frame synthesis unit 41 overlaps output of two neighboring frames from the windowing unit 42 in a manner taking out K/2 samples from each of them, and obtains an output signal (the left-side of Equation (7)) at t=0, 1, . . . , K−1 by the following Equation (7). The obtained output signal is transmitted from the frame synthesis unit 41 to the output terminal 5.

$$\hat{x}_n(t)=\bar{x}_{n-1}(t+K/2)+\bar{x}_n(t) \tag{7}$$

Meanwhile, although the transformation in the transformation unit 2 and the inverse transformation unit 4 has been described as Fourier transform in FIG. 2 and FIG. 3, the transformation unit 2 and the inverse transformation unit 4 can use another transformation such as cosine transform, modified cosine transform, Hadamard transform, Haar transform or wavelet transform in place of Fourier transform. For example, because cosine transform and modified cosine transform obtain only the magnitude as a transformation result, a route to the inverse transformation unit 4 from the transformation unit 2 in FIG. 1 becomes unnecessary. In addition, because noise information to be recorded in the noise information storage unit 6 is only for the magnitude (or power), it contributes to a reduction in storage capacity and a reduction in amount of calculation in the noise suppression processing. Haar transform does not need multiplications, and thus the area when the function is integrated into an LSI can be reduced. Regarding wavelet transform, improvement of a noise suppression effect can be expected because different time resolutions can be applied according to the frequency.

Further, the noise suppression unit 3 can perform actual suppression after the transformation unit 2 has integrated a plurality of frequency components. On this occasion, by integrating more frequency components in low frequency ranges where auditory discrimination capability is higher than in high frequency ranges, the transformation unit 2 can achieve high sound quality. In addition, when noise suppression is carried out after a plurality of frequency components have been integrated, the noise suppressing apparatus 100 can reduce the total amount of calculation because the number of frequency components in which noise suppression is applied becomes small.

[Processing of Noise Suppression Unit]

Although the noise suppression unit 3 can perform various suppressions, there are SS (Spectral Subtraction) method and MMSE STSA (Minimum Mean-Square Error Short-Time Spectral Amplitude Estimator) method as typical ones. SS method subtracts mixed noise information supplied by the mixing unit 11 from a noisy signal magnitude spectrum supplied by the transformation unit 2. MMSE STSA method calculates a suppression coefficient for each of a plurality of frequency components using mixed noise information supplied from the mixing unit 11 and a noisy signal magnitude spectrum supplied from the transformation unit 2, and multiplies the noisy signal magnitude spectrum by this suppression coefficient. This suppression coefficient is determined so that the mean square power of an enhanced signal should be minimized.

Concerning suppression of noise in the noise suppression unit 3, flooring may be applied in order to avoid excessive suppression. Flooring is a method to avoid suppression beyond a maximum suppression quantity. It is a flooring parameter that determines a maximum suppression quantity. SS method imposes restriction so that a result of subtraction of modified noise information from a noisy signal magnitude spectrum shall not become smaller than the flooring parameter. Specifically, when a subtraction result is smaller than the flooring parameter value, SS method substitutes the subtraction result with the flooring parameter value. Similarly, when the suppression coefficient obtained from the modified noise information and the noisy signal magnitude spectrum is smaller than the flooring parameter, MMSE STSA method substitutes the suppression coefficient with the flooring parameter. Details of the flooring are disclosed in a document "M. Berouti, R. Schwartz and J. Makhoul, "Enhancement of speech corrupted by acoustic noise," Proceedings of ICASSP'79, pp. 208-211, April 1979". By introducing a flooring parameter, the noise suppression unit 3 does not cause excessive suppression and prevents large distortions in the enhanced signal.

The noise suppression unit 3 can also set the number of frequency components of the noise information such that it is smaller than the number of frequency components of the noisy signal spectrum. In this case, each of a plurality of noise information will be shared by a plurality of frequency components. Compared with a case when a plurality of frequency components are integrated into a smaller number of frequency components for both a noisy signal spectrum and noise information, frequency resolution of the noisy signal spectrum is high. Therefore, the noise suppression unit 3 can achieve high sound quality with an amount of calculation less than a case when there is no integration of the frequency components at all. Details of suppression using noise information of the number of frequency components less than the number of frequency components of a noisy signal spectrum are disclosed in Japanese Patent Application Laid-Open No. 2008-203879.

[Structure of Noise Information Storage Unit]

Figure 4:
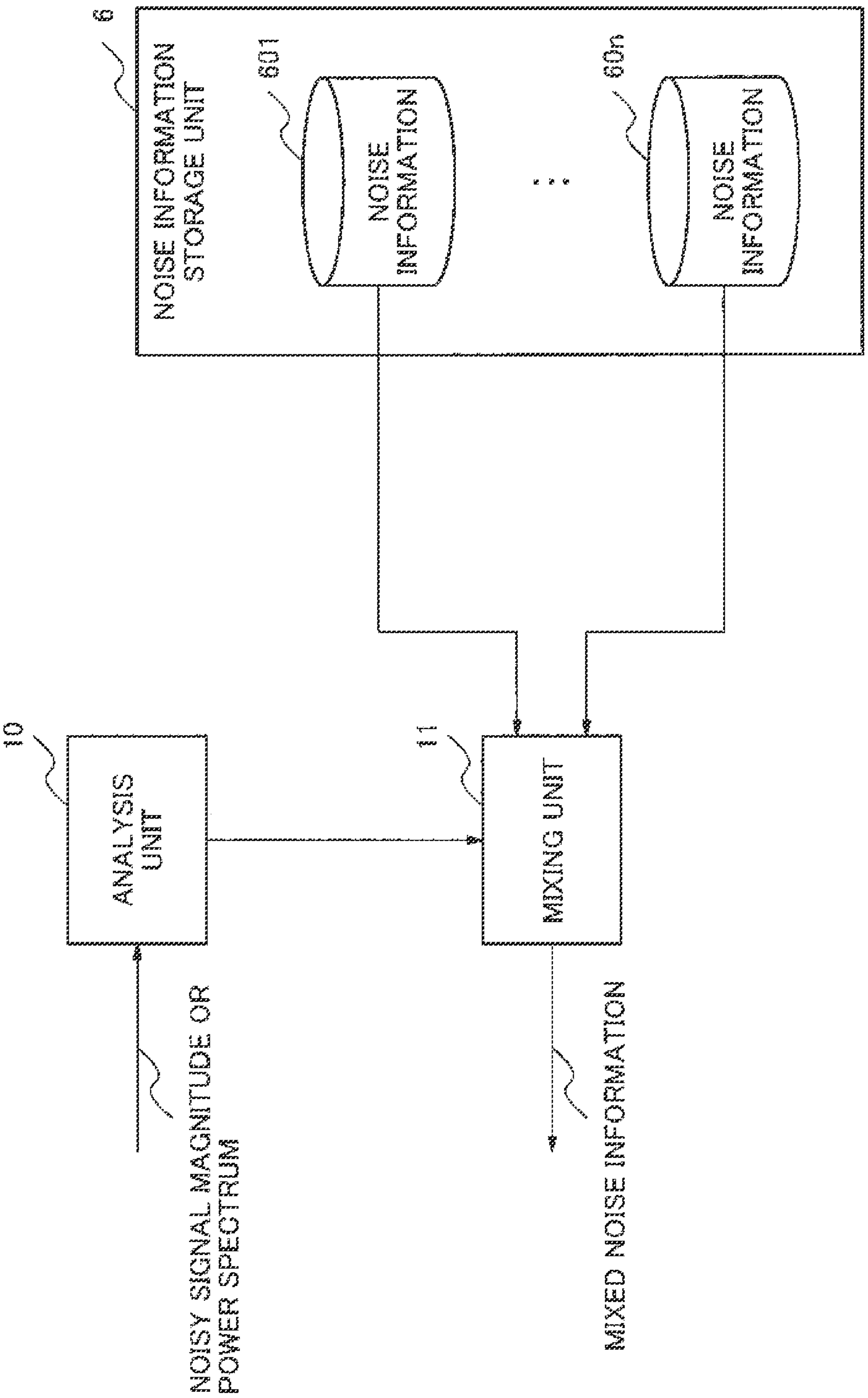
FIG. 4 is a block diagram showing a structure in a noise information storage unit included in a noise suppressing apparatus according to the first exemplary embodiment of the present invention.

FIG. 4 is a diagram for illustrating an internal configuration of the noise information storage unit 6. In FIG. 4, a plurality of noise information 601-60*n* are stored in the noise information storage unit 6 in advance. Noise information 601-60*n* may be a combination of the maximum and the average noise information of known noise, a combination of the maximum, the average and the minimum noise information, a combination of peak component of noise information and others, or a combination of the impact component of noise information and others, for example. Noise information 601-60*n* may include statistical values such as the variance and the median. In addition to a spectrum, the noise information storage unit 6 may memorize feature quantities such as the phase frequency characteristics, and strength and variance in time in specific frequencies.

Meanwhile, the definition of average noise information, maximum noise information, minimum noise information, peak components of noise information and impact component of noise information are as follows.

Average noise information: Information obtained by averaging magnitude (or power) of the same frequency component of a plurality of spectra derived by Fourier transform for the whole of known noise (over a plurality of frames). That is, so-called an average spectrum averaged along the time axis.

Maximum noise information: The maximum value of magnitude (or power) of a plurality of the same frequency component of spectra derived by Fourier transform for the whole of known noise (over a plurality of frames) for each frequency component. That is, so-called a maximum spectrum.

Minimum noise information: The minimum value of magnitude (or power) of a plurality of the same frequency component of spectra derived by Fourier transform for the whole of known noise (over a plurality of frames) for each frequency component. That is, so-called the minimum spectrum.

Peak components of noise information: A frequency component in spectra derived by Fourier transform for the whole of known noise (over a plurality of frames) including a significantly large value in the neighborhood when magnitudes are compared along the frequency.

Impact component of noise information: The average of a plurality of spectra derived by Fourier transform in all impact noise frames. That is, so-called an average spectrum of impact noise. Impact noise itself has a large value for a very short duration when changes of an audio signal before Fourier transform in time is observed. In contrast, a spectrum after Fourier transform has a feature that magnitude along frequency is almost constant over a predetermined bandwidth.

By the above mentioned structure, according to this exemplary embodiment, noise suppression for highly non-stationary signals with many changes in their characteristics can be realized. In particular, if average and maximum noise information are to be mixed, it is possible to synthesize an arbitrary value between the average and the maximum by changing a mixing ratio, and thus pseudo noise becomes more accurate, and sound quality by the suppression improves. In cases where the average and the minimum noise information or the maximum, the average, and the minimum noise information are to be mixed, a similar effect is obtained.

Second Exemplary Embodiment

Figure 5:
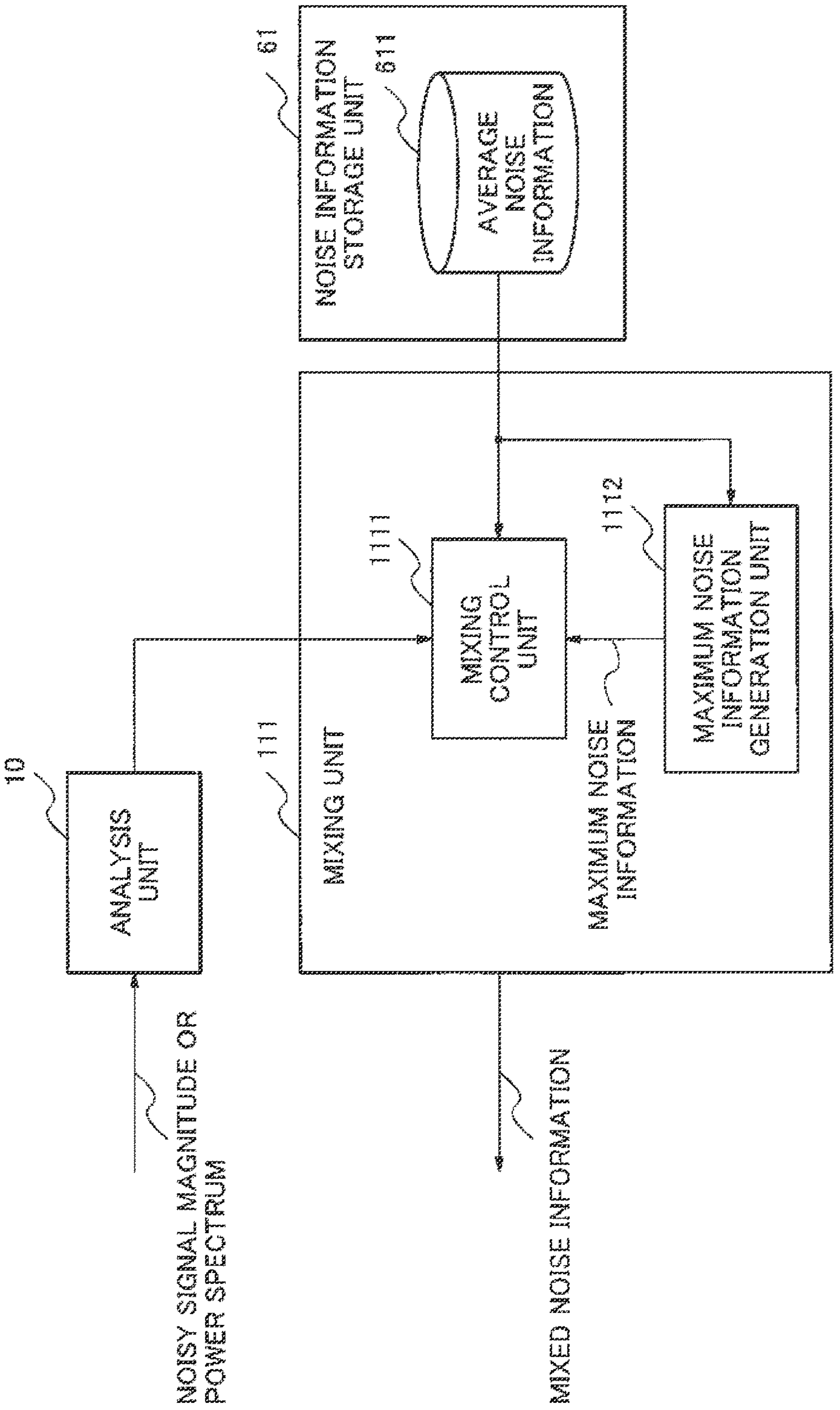
FIG. 5 is a block diagram showing a structure of a mixing unit and a noise information storage unit included in a noise suppressing apparatus according to a second exemplary embodiment of the present invention.

A noise suppressing apparatus as the second exemplary embodiment of the present invention will be described using FIG. 5. Compared with the first exemplary embodiment, a noise suppressing apparatus according to this exemplary embodiment is different in the contents of a noise information storage unit 61 and the structure of a mixing unit 111, and other structures are the same as those of the first exemplary embodiment. Therefore, a same number is attached to a same structure here, and description will be omitted.

In this exemplary embodiment, the noise information storage unit 61 stores only average noise information 611. A maximum noise information generation unit 1112 in the mixing unit 111 generates maximum noise information from the average noise information 611. A mixing control unit 1111 mixes the average noise information and the generated maximum noise information in a weighted mixing manner.

Meanwhile, although the maximum noise information generation unit 1112 generates maximum noise information in this exemplary embodiment, the present invention is not limited to this, and the minimum noise information may be generated from average noise information in the mixing unit 111. Moreover, noise information stored in the noise information storage unit 61 is not limited either to the average noise information 611, and it may be maximum noise information or minimum noise information.

For supplied noise information N, the mixing unit 111 may generate a maximum noise information $\beta N$ by multiplying it by a coefficient $\beta$, and add then with weights $\alpha\mathbf{1}$ and $\alpha\mathbf{2}$ according to an analysis result by the analysis unit 10, and obtain mixed noise information $M=\alpha\mathbf{1}N+\alpha\mathbf{2}\beta N$. In this case, the mixed noise information M can be expressed as $M=(\alpha\mathbf{1}+\alpha\mathbf{2}\beta)N=\gamma N$. Consequently, the mixed noise information M will be information which is obtained by multiplying supplied noise information N by the coefficient $\gamma$. That is, if the coefficient $\gamma$ is calculated according to an analysis result by the analysis unit 10 (this process can be called a mixing step), the mixing unit 111 will multiply the supplied noise information N by the coefficient $\gamma$. It also applies to a case where multiple pieces of noise information are generated from the stored noise information.

When such control is carried out, the maximum noise information generation unit 1112 does not exist, and, following the above-mentioned $M=(\alpha\mathbf{1}+\alpha\mathbf{2}\beta)N=\gamma N$, the mixing control unit 1111 calculates $\alpha\mathbf{1}+\alpha\mathbf{2}\beta$ according to $\alpha\mathbf{1}$ and $\alpha\mathbf{2}$ obtained from the information provided by the analysis unit 10 and obtains $\gamma N$ using the result $\gamma$ and the noise information N from the noise information storage unit 61. That is, calculation of $\alpha\mathbf{1}+\alpha\mathbf{2}\beta$ corresponds to the mixing processing. Evaluation of this degree of similarity is not limited to a case where spectrum shapes are compared over all frequency bands. The degree of similarity may be calculated by comparing some representing frequency bands with each other. By doing like this, eventual similarity evaluation becomes more accurate in cases where existence of special characteristics of a spectrum shape is limited to certain frequency bands.

According to this exemplary embodiment, by generating another piece of noise information from noise information stored in the noise information storage unit 61 and mixing them, noise suppression for highly nonstationary signals with many changes in their characteristics can be realized while the storage capacity of the noise information storage unit 61 is kept small.

Third Exemplary Embodiment

A noise suppressing apparatus as the third exemplary embodiment of the present invention will be described using FIG. 6. Compared with the first exemplary embodiment, a noise suppressing apparatus according to this exemplary embodiment is different in the internal configuration of the analysis unit and the contents of the noise information storage unit, and other structures are the same as those of the first exemplary embodiment. Therefore, a same number is attached to a same structure here, and description will be omitted. In this exemplary embodiment, the basic component and a special component of information of noise to be suppressed are stored separately in advance, and if the special component is detected in a noisy signal, mixed noise information is generated using the stored special component. In this exemplary embodiment, storing and detection of a peak component as an example of a special component is performed.

Figure 6:
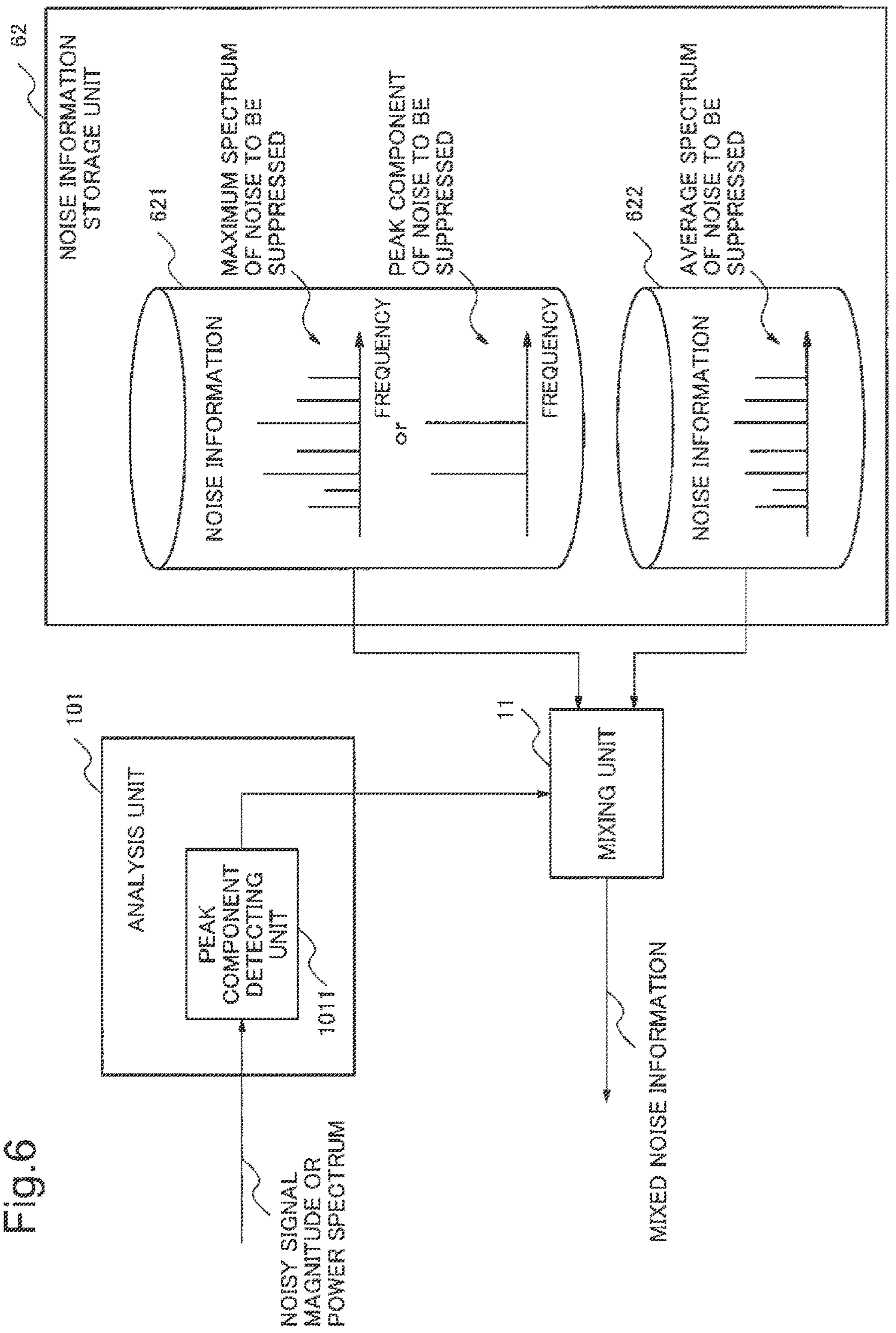
FIG. 6 is a block diagram showing a schematic configuration of a noise suppressing apparatus according to a third exemplary embodiment of the present invention.

In FIG. 6, an analysis unit 101 includes a peak component detecting unit 1011. The peak component detecting unit 1011 detects frequency components identified as a peak from a supplied noisy signal spectrum. For example, a frequency component including a magnitude value larger than a predetermined threshold and, in addition, larger than that of the surrounding frequency components is determined as a peak. It is also possible that, when a difference with a magnitude value in the adjacent frequency on both sides is no smaller than a predetermined threshold value, the peak component detecting unit 1011 declares it as a peak component, for example. In a case where a frequency component in which a peak of noise may exist is known in advance, the peak component detecting unit 1011 may search for peaks only in its neighborhood.

The mixing unit 11 mixes noise information of the frequency component determined to be a peak and others with different ratios. For example, the maximum spectrum and the average spectrum of noise to be suppressed are stored in a noise information storage unit 62 as noise information 621 and noise information 622, respectively, in advance.

Then, peak positions are detected by peak component detection, and the mixing unit 11 should simply change the mixing ratios of the maximum value from the noise information 621 and the mean value from the noise information 622 according to the location (or equivalently the frequency component). For example, the peak component detecting unit 1011 may perform peak detection for each of all frequency components (a total of 1024, for example) independently, and, for frequency components including a peak, the mixing unit 11 may mix 80% of the magnitude of the maximum spectrum and 20% of the magnitude of the average spectrum.

On the other hand, for components without a peak, the mixing unit 11 may use 100% of the magnitude of the average spectrum. According to the accuracy of a peak detection (likelihood of peak existence), the mixing unit 11 may change the mixing ratio. For example, the mixing unit 11 may set the magnitude of the maximum spectrum to 100% for a frequency component with a 100% peak-detection confidence.

It is also possible that a peak component of noise to be suppressed and other components are stored in the noise information storage unit 62 separately in advance, and, as a frequency component determined as a peak, the mixing unit 11 reads the stored peak component, and, as a frequency component determined as a non-peak, it reads the other component. For example, even if a frequency component detected by the peak component detecting unit 1011 deviates from the peak component stored as the noise information 621, when the amount of deviation (the number of steps of frequency) is no more than a predetermined value, the mixing unit 11 performs mixing using the magnitude stored as the peak component.

Figure 7:
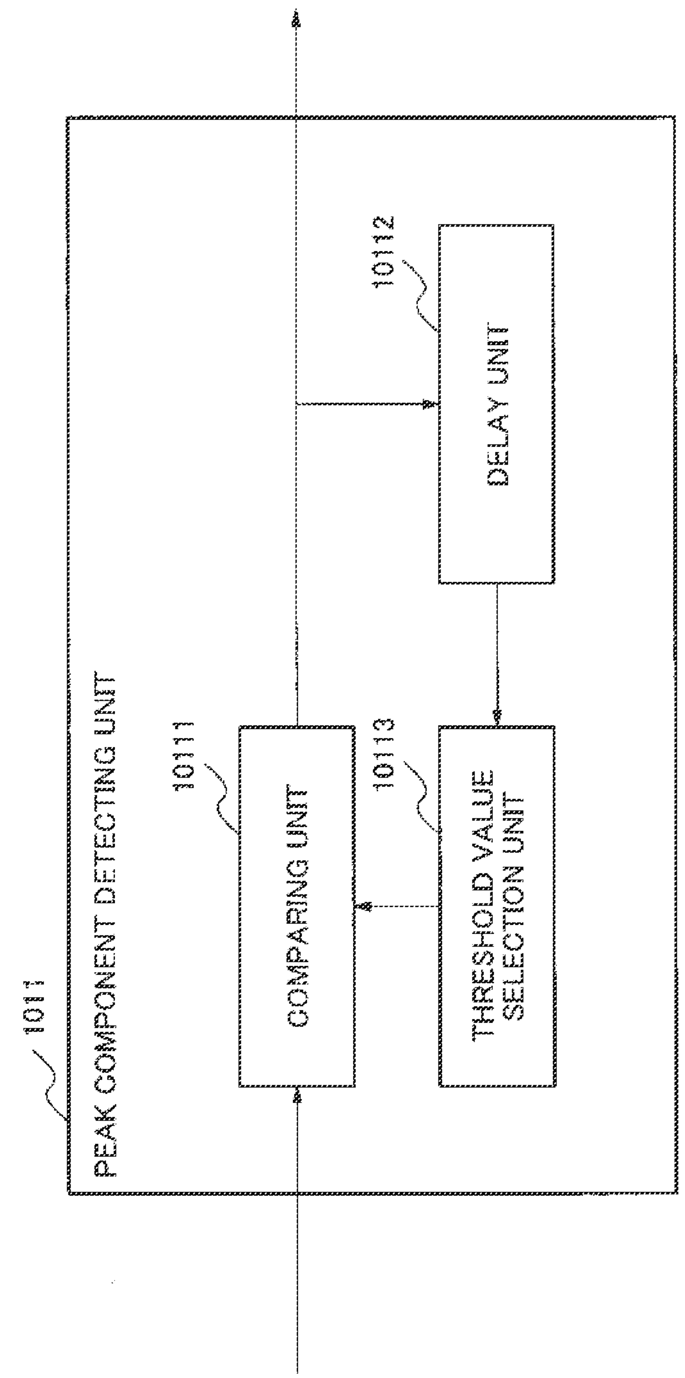
FIG. 7 is a block diagram showing a schematic configuration of a peak component detecting unit according to the third exemplary embodiment of the present invention.

The internal configuration of the peak component detecting unit 1011 will be described using FIG. 7. The peak component detecting unit 1011 includes a comparing unit 10111, a delay unit 10112 and a threshold value selection unit 10113 as shown in FIG. 7.

A peak tends to exist in the neighborhood (e.g. Frequency components 4-6 and 19-21) of frequencies (e.g. Frequencies 5 and 20) where a peak had been located in the past (such as in the previous frame). The peak component detecting unit 1011 detects a peak on the basis of this fact. By making the threshold value of peak detection small only in the neighborhood of such past-peak frequencies, for example, the peak component detecting unit 1011 makes it easy to detect a peak.

Specifically, the comparing unit 10111 compares magnitude (or power) in a noisy signal with a threshold value for each frequency component. Then, the comparing unit 10111 stores the information on a frequency component that has been identified as a peak into the delay unit 10112. In the following several frames, the threshold value selection unit 10113 selects a small threshold value in the neighborhood of the frequency where a peak has been detected, and hands it to the comparing unit 10111. As a result, in the neighborhood of the frequency component where a peak has been found once, it becomes easy to detect a peak again.

The threshold value selection unit 10113 may refer to a frequency of a peak component stored in the noise information storage unit, and, for frequencies in the neighborhood of that frequency, lower the threshold value to make it easy to detect a peak.

In this exemplary embodiment, peak components are treated as an independent mixing component. Because peaks exist locally, only the position and the value of a peak can be stored. In other words, according to this exemplary embodiment, because a memory does not need to cover all possible frequency positions, the memory capacity can be reduced. Also, by separating a peak, a dynamic range can be made smaller than a case where the peak and other components are stored in a mixed manner. This leads to improved accuracy, and reduction in the number of bits which further leads to reduction of the memory area. Equivalently, it is useful for cost reduction.

Fourth Exemplary Embodiment

A noise suppressing apparatus as the fourth exemplary embodiment of the present invention will be described using FIG. 8. This exemplary embodiment will describe a specific example of an internal configuration of a mixing unit shown in FIG. 4. Because structures besides the mixing unit are the same as those of the first exemplary embodiment, description will be omitted here.

Figure 8:
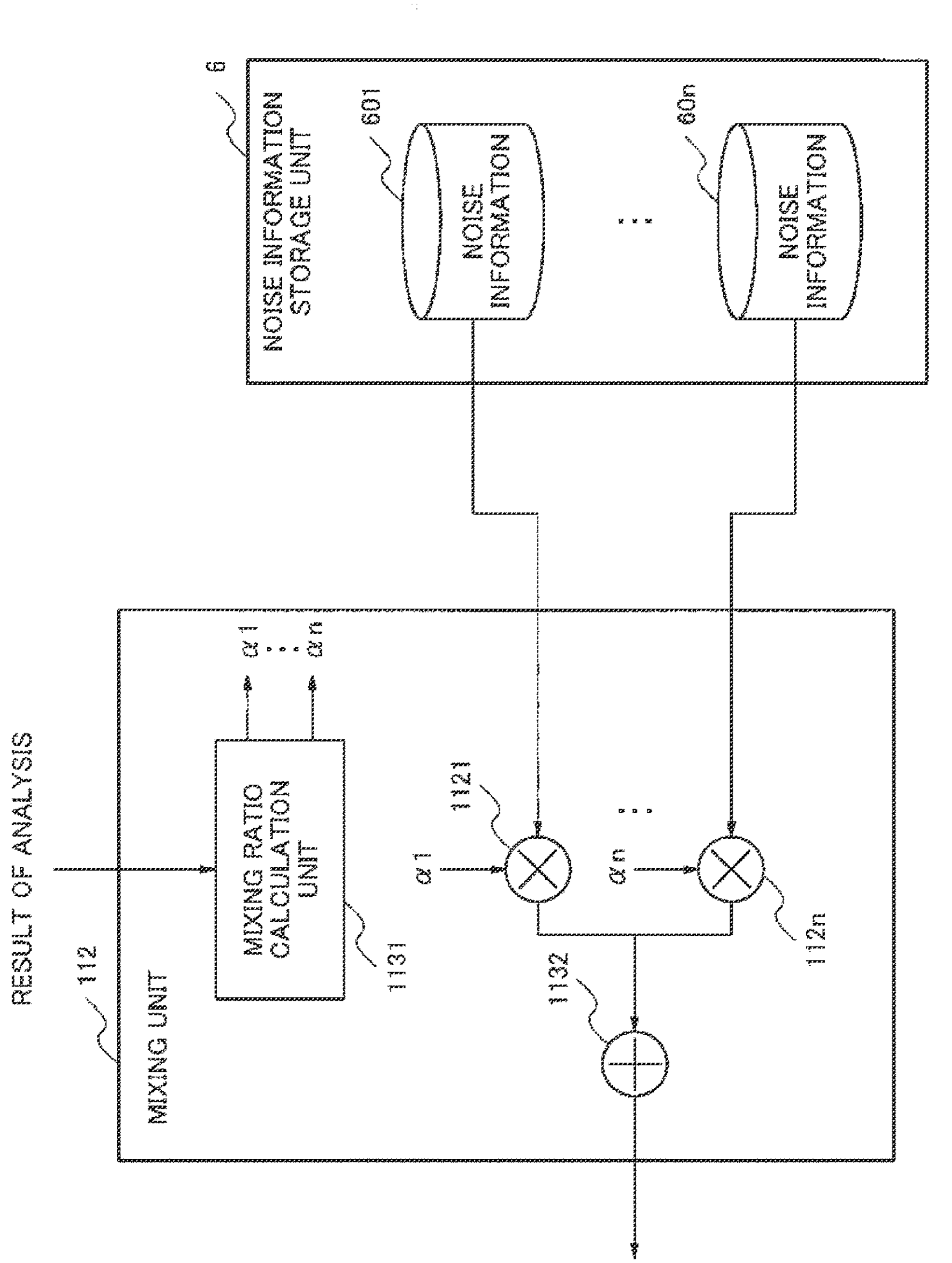
FIG. 8 is a block diagram showing a structure of a mixing unit and a noise information storage unit included in a noise suppressing apparatus according to a fourth exemplary embodiment of the present invention.

In FIG. 8, a mixing unit 112 is equipped with a mixing ratio calculation unit 1131 that calculates mixing ratios of noise information α1-αn based on a result of analysis by the analysis unit 10.

The calculated mixing ratios α1-αn are handed to multipliers 1121-112*n*, respectively, and the each of noise information 601-60*n* are multiplied by the ratios in the respective multipliers 1121-112*n*. In other words, when a result of analysis of noisy signal indicates that 80% of the noise information 601 should be mixed, the mixing ratio calculation unit 1131 outputs 0.8 as α1. Then, the multiplier 1121 multiplies the noise information 601 by 0.8. The noise information which has been multiplied by the coefficient is supplied to an adder 1132 and added. As a result, mixed noise information is generated.

Meanwhile, although noise information is multiplied by a coefficient and undergoes linear addition in this exemplary embodiment as an example, the present invention is not limited to this, and noise information may be mixed non-linearly using a mathematical equation according to a result of analysis, for example.

Fifth Exemplary Embodiment

Figure 9:
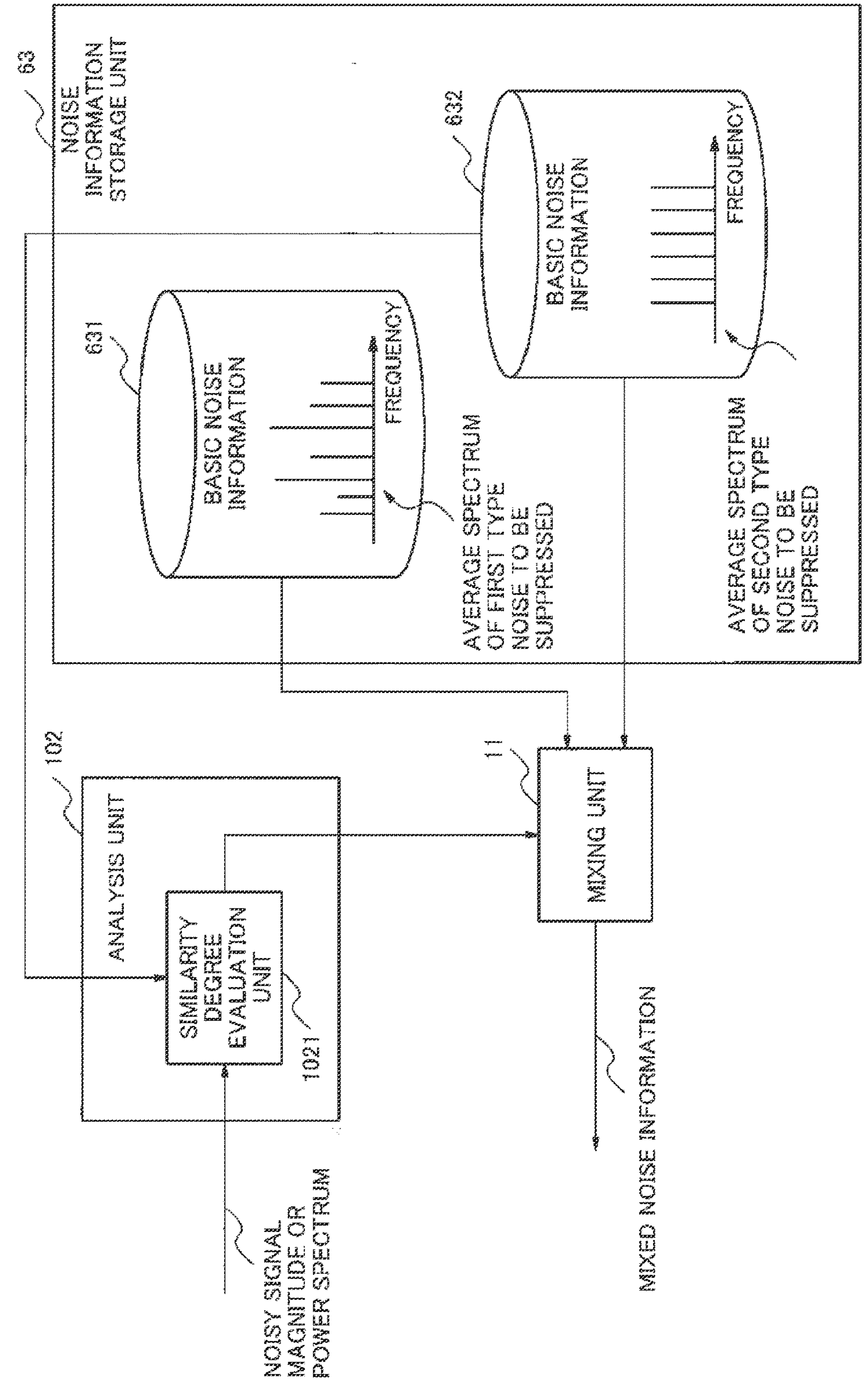
FIG. 9 is a block diagram showing a structure of an analysis unit and a noise information storage unit of a noise suppressing apparatus according to a fifth exemplary embodiment of the present invention.

A noise suppressing apparatus as the fifth exemplary embodiment of the present invention will be described using FIG. 9. In this exemplary embodiment, another example of an internal configuration of the mixing unit 11 indicated in the first exemplary embodiment will be described. Because structures besides the detecting unit are the same as those of the first exemplary embodiment, the same numbers are attached to the same structures here, and description will be omitted.

First, an analysis unit 102 according to this exemplary embodiment has a similarity degree evaluation unit 1021. A noise to be suppressed in this exemplary embodiment is special noise information including a special spectrum shape. The similarity degree evaluation unit 1021 evaluates the similarity between a special noise information 632 stored in a noise information storage unit 63 in advance and an inputted noisy signal spectrum. Then, the special noise information 632 is mixed with a weight corresponding to its similarity degree.

Specifically, the similarity degree evaluation unit 1021 stores an impact noise spectrum (including almost constant magnitude over a predetermined frequency range) as the special noise information 632, and evaluates the similarity degree between the shape of the inputted noisy signal spectrum and the impact noise spectrum.

As for evaluation of the similarity degree, the similarity degree evaluation unit 1021 calculates the square sum of a difference between frequency component values of the two spectra, and normalizes it by the sum of square values of the frequency component values of the spectrum of the special noise information 632. The similarity degree evaluation unit 1021 declares similarity when said normalized value is smaller than a threshold value. The similarity degree evaluation unit 1021 may normalize the square sum of the product of frequency component values of the two spectra by the sum of the square values of the frequency component values of the spectrum of the special noise information 632.

Noise to be evaluated for the similarity degree is not limited to impact noise, and it may be any noise including a characteristic feature in the spectrum shape. The similarity degree evaluation unit 1021 may evaluate the similarity degree using a spectral envelope. In other words, the similarity degree evaluation unit 1021 may perform calculation by integrating numerical values of 1024 frequency components into eight values, for example, to reduce the number of computations.

If the similarity degree to impact noise obtained in this way is 80%, mixed noise information in which 80% of the impact noise and 20% of other reference signals are mixed is generated.

There is a remarkable difference in the characteristics of impact noise component and other noise components. Accordingly, one of them cannot be modified to make the other. By storing the impact component separately from other components, this exemplary embodiment can prepare faithful data to respective characteristics. As a result, the noise suppressing apparatus can generate highly accurate noise replica and an effect that sound quality improves by suppression is obtained.

Sixth Exemplary Embodiment

A noise suppressing apparatus 600 as the sixth exemplary embodiment of the present invention will be described using FIG. 10. When comparing with the first exemplary embodiment, the noise suppressing apparatus 600 according to this exemplary embodiment is different in a point that a modification unit 7 is provided between the noise information storage unit 6 and the mixing unit 11. Because the other structures are the same as those of the first exemplary embodiment, a same number is attached to a same structure here, and description will be omitted.

Figure 10:
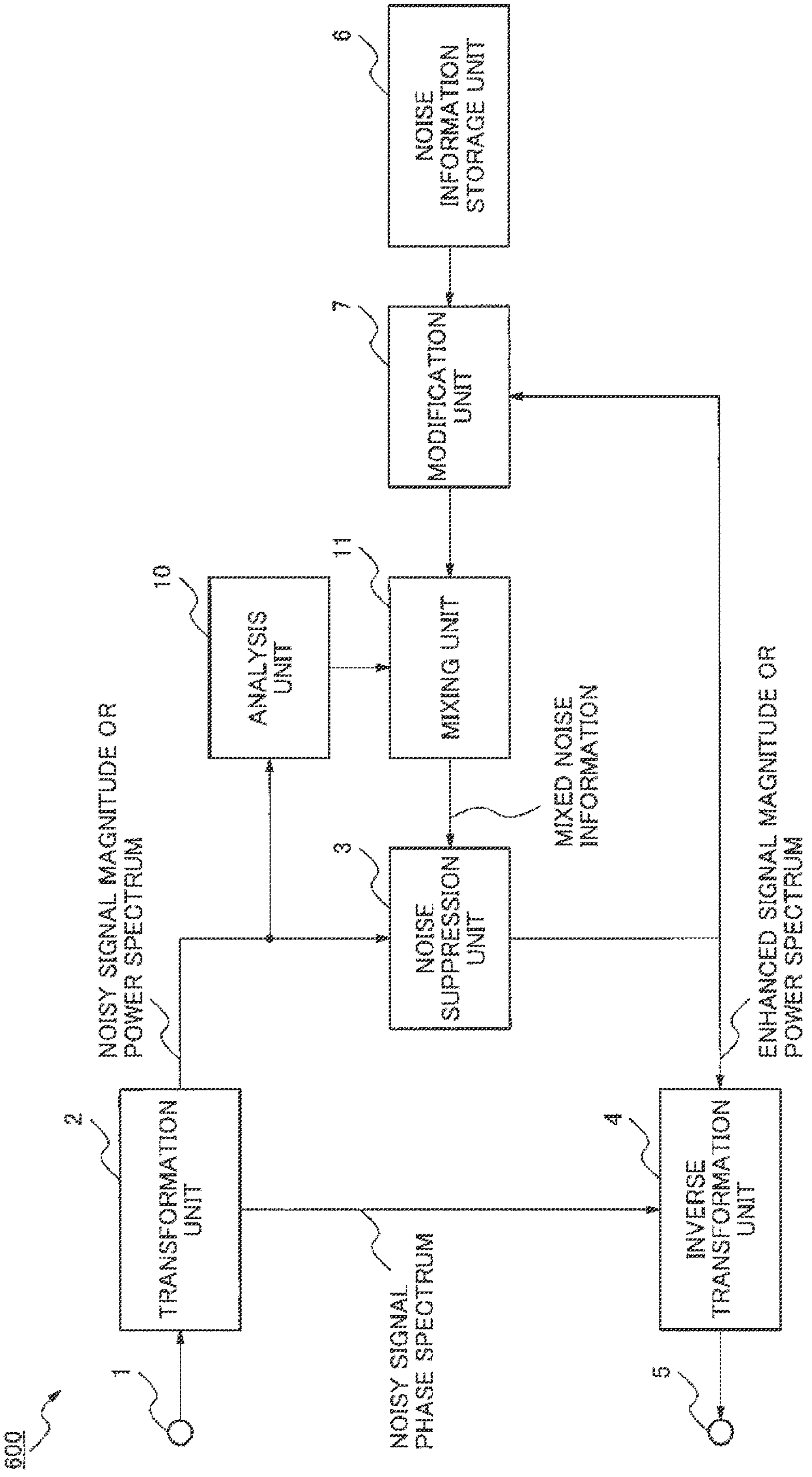
FIG. 10 is a block diagram showing a schematic configuration of a noise suppressing apparatus according to a sixth exemplary embodiment of the present invention.

In FIG. 10, the modification unit 7 modifies noise information by multiplying a scaling factor that is based on an enhanced signal magnitude spectrum as a noise suppression result supplied from the noise suppression unit 3, and supplies it to the mixing unit 11 as modified noise information.

[Configuration of Modification Unit]

Figure 11:
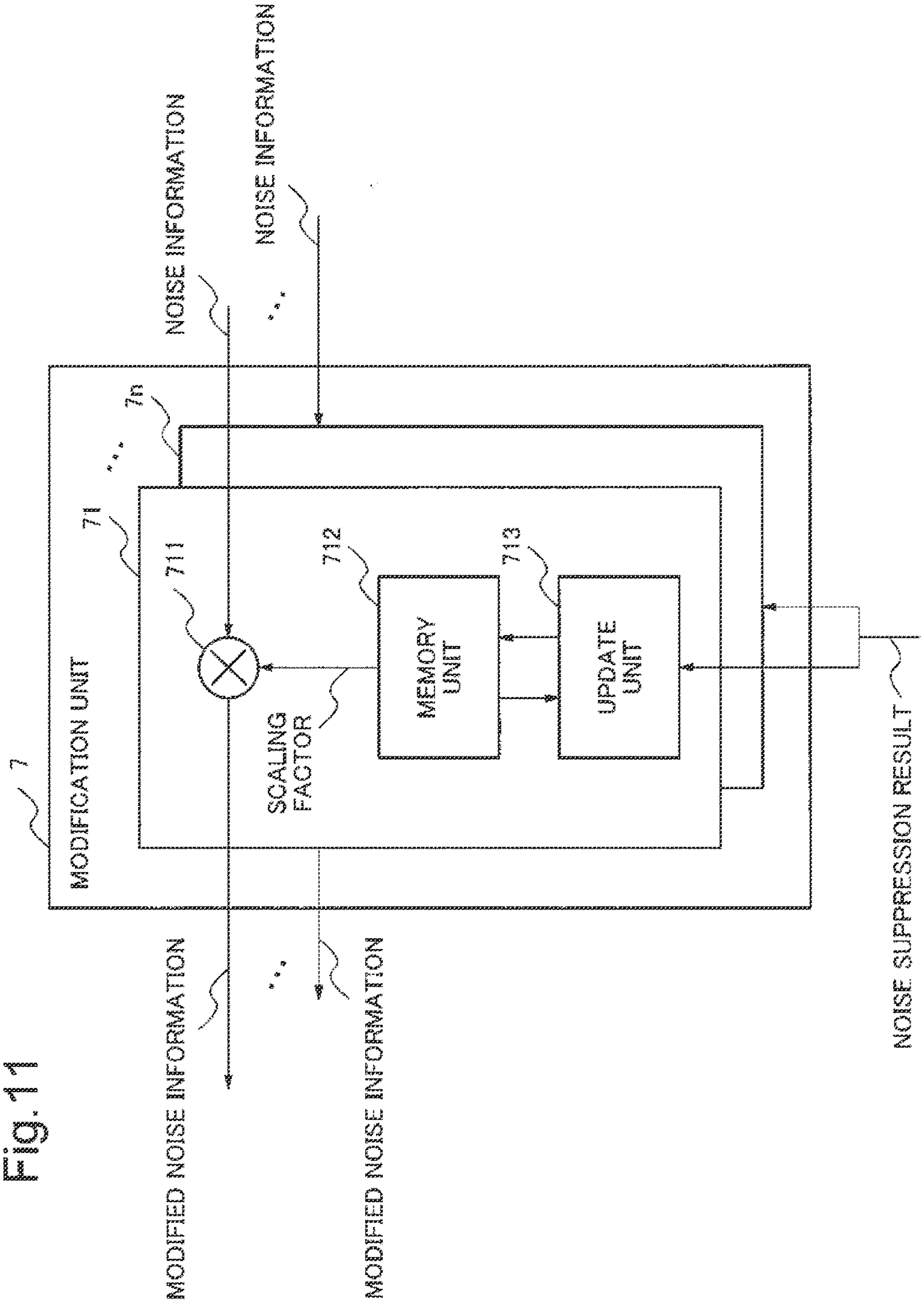
FIG. 11 is a block diagram showing a schematic configuration of a modification unit of a noise suppressing apparatus according to the sixth exemplary embodiment of the present invention.

FIG. 11 is a block diagram showing an internal configuration of the modification unit 7. Corresponding to the number of noise information stored in the noise information storage unit 6, the modification unit 7 has a plurality of modified noise information generating units 71-7*n*. Of course, as shown in FIG. 5, in a case where only one piece of noise information is stored, it should also be equipped with only one modified noise information generating unit.

Each of the modified noise information generating units 71-7*n* includes a multiplier 711, a memory unit 712 and an update unit 713. Noise information supplied to the modification unit 7 is then supplied to the multiplier 711. The memory unit 712 stores a scaling factor as information for modification used when noise information is modified. The multiplier 711 obtains a product of the noise information and the scaling factor, and outputs it as modified noise information.

On the other hand, enhanced signal magnitude spectrum is supplied to the update unit 713 as a noise suppression result. The update unit 713 reads the scaling factor in the memory unit 712, changes the scaling factor using the noise suppression result, and supplies the new scaling factor after the change to the memory unit 712. The memory unit 712 newly stores the new scaling factor in place of the old scaling factor stored until then.

In a case where a scaling factor is updated using a noise suppression result that has been fed back, the update unit 713 updates the scaling factor so that the larger a noise suppression result without a target signal is (the larger the residual noise is), the larger the modified noise information becomes. This is because a large noise suppression result without the target signal indicates insufficient suppression, and thus it is desired to make the modified noise information large by changing the scaling factor. When the modified noise information is large, a numerical value to be subtracted will be large in SS method. Therefore, a noise suppression result becomes small.

Also, in multiplication type suppression like MMSE STSA method, a small suppression coefficient is obtained because an estimated signal to noise ratio used for calculation of a suppression coefficient becomes small. This brings stronger noise suppression. As a method to update a scaling factor, a plurality of methods can be thought. As an example, a recalculation method and a sequential update method will be described.

As for a noise suppression result, a state that noise is suppressed completely is ideal. For this reason, when magnitude or power of a noisy signal is small, for example, the modification unit 7 can recalculate the scaling factor or update it sequentially so that the noise may be suppressed completely. This is because, when magnitude or power of a noisy signal is small, there is a high probability that the power of signals other than the noise to be suppressed is also small. The modification unit 7 can detect that the magnitude or power of a noisy signal is small using a comparison result that the magnitude or power of the noisy signal is smaller than a threshold value.

The modification unit 7 can also detect that the magnitude or power of a noisy signal is small by a fact that a difference between the magnitude or power of a noisy signal and noise information recorded in the noise information storage unit 6 is smaller than a threshold value. That is, when the magnitude or power of the noisy signal resembles the noise information, the modification unit 7 utilizes that the share of the noise information in the noisy signal is high (the signal to noise ratio is low). In particular, by using information at a plurality of frequency points in a combined manner, it becomes possible for the modification unit 7 to compare spectral envelopes and make a highly accurate detection.

A scaling factor for the SS method is recalculated so that, in each frequency, modified noise information becomes equal to a noisy signal spectrum when a target signal is absent. In other words, the modification unit 7 calculates the scaling factor an so that a noisy signal magnitude spectrum $|Yn(k)|$ supplied from the transformation unit 2 when only noise is inputted and the product of scaling factor an and a noise information $\nu(k)$ should be identical. Here, n is a frame index and k is a frequency index. That is, a scaling factor $\alpha n(k)$ is calculated by the following equation (8).

$$\alpha n(k)=|Yn(k)|/\nu n(k) \tag{8}$$

On the other hand, in sequential update of a scaling factor for the SS method, a scaling factor is updated, in each frequency, a little bit at a time so that an enhanced signal magnitude spectrum when a target signal is absent should approach zero. When the LMS (Least Squares Method) algorithm is used for sequential update, the modification unit 7 calculates $\alpha n+1(k)$ by the following equation (9) using an error en(k) in frequency k and in frame n.

$$\alpha n+1(k)=\alpha n(k)+\mu en(k)/\nu n(k) \tag{9}$$

$\mu$ is a small constant called a step size.

When immediately using the scaling factor $\alpha n(k)$ obtained by the calculation, the modification unit 7 uses the following equation (10) instead of the equation (9).

$$\alpha n(k)=\alpha n-1(k)+\mu en(k)/\nu n(k) \tag{10}$$

That is, the modification unit 7 calculates the current scaling factor $\alpha n(k)$ using the current error, and apply it immediately. By updating the scaling factor immediately, the modification unit 7 can realize noise suppression with high accuracy in real time.

When the NLMS (Normalized Least Squares Method) algorithm is used, the scaling factor αn+1(k) is calculated by the following equation (11) using the above-mentioned error en (k).

$$\alpha n+1(k)=\alpha n(k)+\mu en(k)vn(k)/\sigma n(k)^2 \quad (11)$$

$\sigma n(k)^2$ is the average power of the noise information νn(k), and can be calculated using an average based on an FIR filter (a moving average using a sliding window), an average based on an IIR filter (leaky integration) or the like.

The modification unit 7 may calculate the scaling factor αn+1(k) by the following Equation (12) using a perturbation method.

$$\alpha n+1(k)=\alpha n(k)+\mu en(k) \quad (12)$$

Alternatively, the modification unit 7 may calculate the scaling factor αn+1(k) by the following Equation (13) using a signum function sgn{en (k)} which represents only the sign of the error.

$$\alpha n+1(k)=\alpha n(k)+\mu sgn\{en(k)\} \quad (13)$$

Similarly, the modification unit 7 may use the LS (Least Squares) algorithm or any other adaptation algorithm. The modification unit 7 can also apply the updated scaling factor immediately, or may perform real time update of the scaling factor by referring to a change from equations (9) to (10) to modify equations (11) to (13).

The MMSE STSA method updates a scaling factor sequentially.

In each frequency, the modification unit 7 updates the scaling factor αn(k) using the same method as the method described using the mathematical expressions (8) to (13).

Regarding the recalculation method and the sequential update method which are the updating methods of a scaling factor mentioned above, the recalculation method has better tracking capability, and the sequential update method has high accuracy. In order to utilize these features, the modification unit 7 can change an updating method such as using the sequential update method in the beginning and using the recalculation method later. In order to determine when to change the updating method, the modification unit 7 may use if the scaling factor sufficiently close to the optimum value as a condition. Alternatively, the modification unit 7 may change the updating method when a predetermined time has elapsed, for example. Otherwise, the modification unit 7 may change the updating method when a modification amount of the scaling factor has become smaller than a predetermined threshold value.

According to this exemplary embodiment, when noise information used for noise suppression is modified, information for modification used for the modification is updated based on a noise suppression result. Consequently, various kinds of noise including unknown noise can be suppressed without storing a large number of noise information in advance.

In addition, according to the noise suppression result, the modification unit 7 may modify the mixing ratio of noise information. In this case, the modification unit 7 can achieve the same effect as this exemplary embodiment by modifying the mixing ratios α1-αn shown in FIG. 8, for example.

Seventh Exemplary Embodiment

Figure 12:
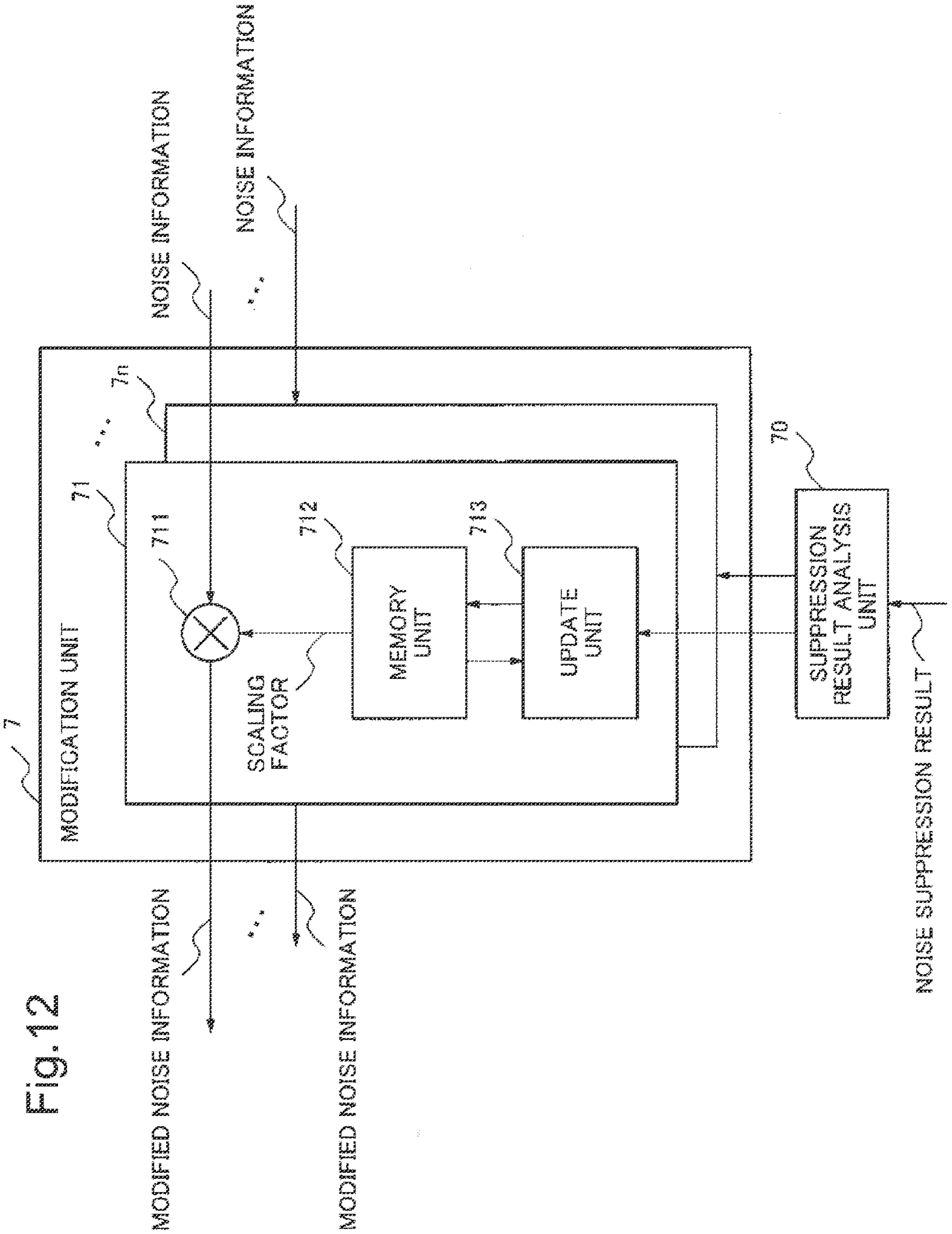
FIG. 12 is a block diagram showing a schematic configuration of a modification unit of a noise suppressing apparatus according to a seventh exemplary embodiment of the present invention.

A noise suppressing apparatus as the seventh exemplary embodiment of the present invention will be described using FIG. 12. When comparing with the sixth exemplary embodiment, the noise suppressing apparatus according to this exemplary embodiment is different in a point that a suppression result analysis unit 70 is provided in the modification unit 7. Because the other structures are the same as those of the sixth exemplary embodiment, a same number is attached to a same structure here, and description will be omitted.

The suppression result analysis unit 70 analyzes a suppression result, and modifies the scaling factor according to the amount of the residual in a plurality of noise information. As a result, the modification unit 7 can modify noise information including a large residual relatively aggressively among each of a plurality of noise information.

Eighth Exemplary Embodiment

A noise suppressing apparatus as the eighth exemplary embodiment of the present invention will be described using FIG. 13. Although the sixth exemplary embodiment has been described taking an example in which a scaling factor is used as information for modification for modifying a noise signal, an example in which a numerical value made by adding an offset to a scaling factor is made information for modification in this exemplary embodiment. In this case, both of the scaling factor and the offset are updated based on a noise suppression result.

Figure 13:
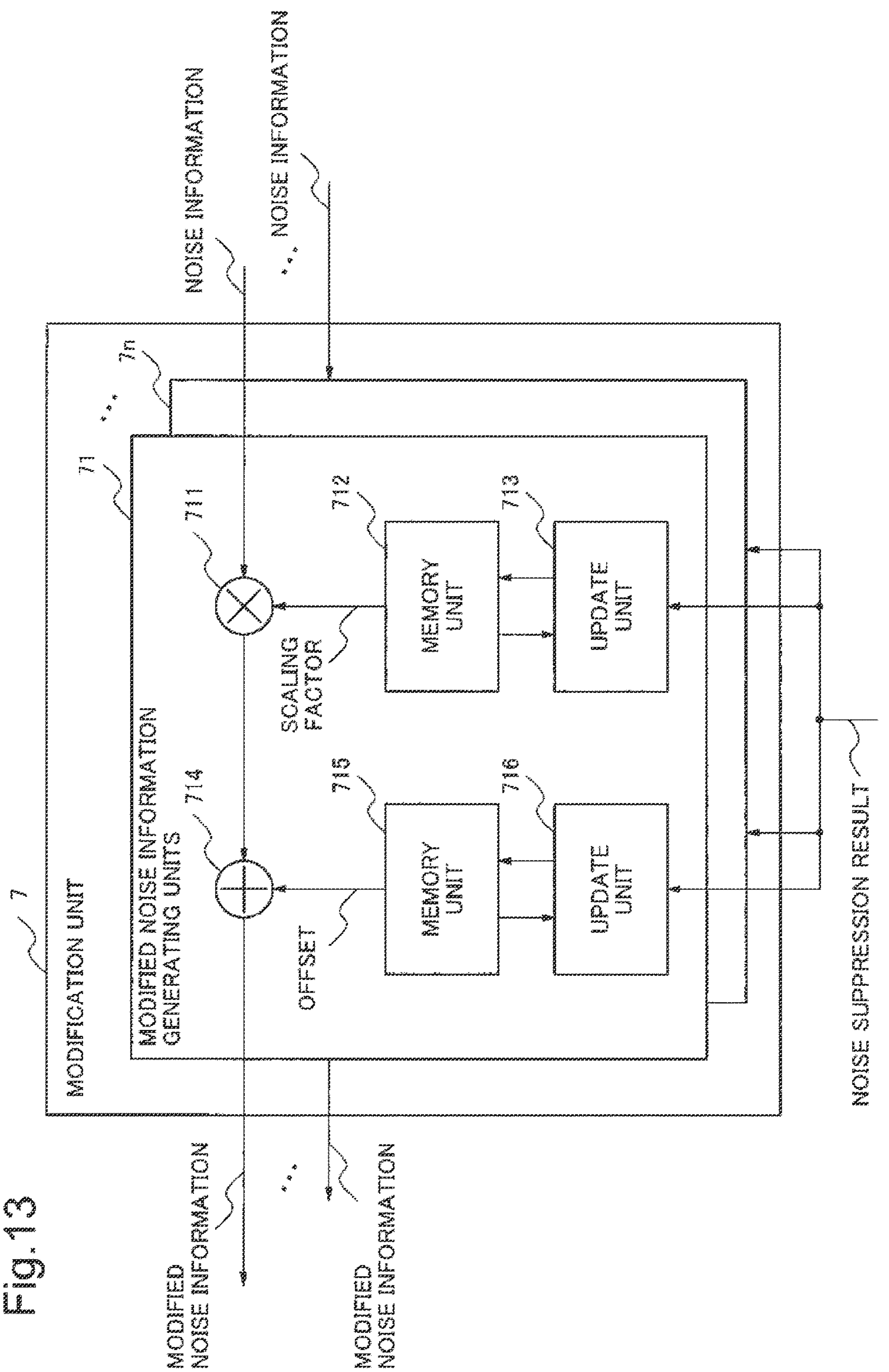
FIG. 13 a block diagram showing a schematic configuration of a modification unit of a noise suppressing apparatus according to an eighth exemplary embodiment of the present invention.

FIG. 13 is a block diagram showing an internal configuration of the modification unit 7. According to the number of noise information stored in the noise information storage unit 6, the modification unit 7 has a plurality of modified noise information generating units 71-7*n*. Of course, when only one piece of noise information is stored as shown in FIG. 5, only one modified noise information generating unit should be provided.

As shown in FIG. 13, each of the modified noise information generating units 71-7*n* includes an adder unit 714, a memory unit 715 and an update unit 716 in addition to the structure shown in FIG. 11. Because the operations of the multiplier 711, the memory unit 712 and the update unit 713 has been described using FIG. 11, description will be omitted here.

The multiplier 711 multiplies supplied noise information by a scaling factor read from the memory unit 712, and supplies the product to the adder unit 714. The adder unit 714 subtracts an offset value stored in the memory unit 715 from the output of the multiplier 711, and outputs the result as modified noise information.

On the other hand, the same noise suppression result as the update unit 713 is supplied to the update unit 716, and the offset value stored in the memory unit 715 is updated using the noise suppression result, and the new offset value is supplied to the memory unit 715. The memory unit 715 newly stores the new offset value in place of the old offset value which have been stored until then.

As above, in this exemplary embodiment, a scaling factor and an offset are employed as information for modification used for modification of noise information. Therefore, noise information can be modified more finely, and, as a result, the noise suppression effect can be improved.

Ninth Exemplary Embodiment

Figure 14:
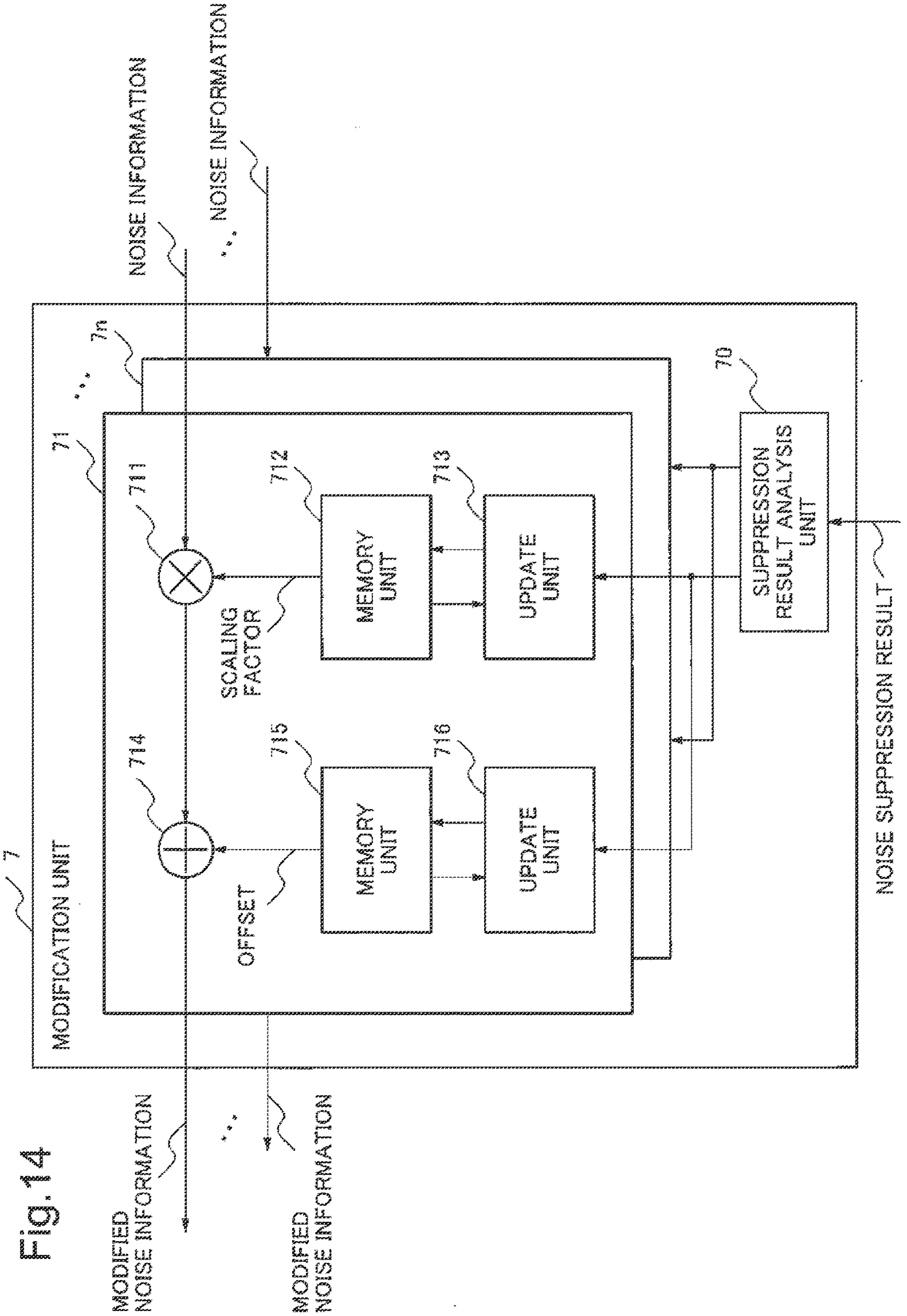
FIG. 14 is a block diagram showing a schematic configuration of a modification unit of a noise suppressing apparatus according to a ninth exemplary embodiment of the present invention.

A noise suppressing apparatus as the ninth exemplary embodiment of the present invention will be described using FIG. 14. When compared with the eighth exemplary embodiment, the noise suppressing apparatus according to this exemplary embodiment is different in a point that the modification unit 7 has the suppression result analysis unit 70. Because the other structures are the same as those of the eighth exemplary embodiment, a same number is attached to a same structure, and description will be omitted here.

In the suppression result analysis unit 70, a suppression result is analyzed, and the offset is corrected according to which noise information has a large remaining non-suppressed amount. As a result, the modification unit 7 can modify noise information including a large residual relatively aggressively among each of a plurality of noise information.

Tenth Exemplary Embodiment

Figure 15:
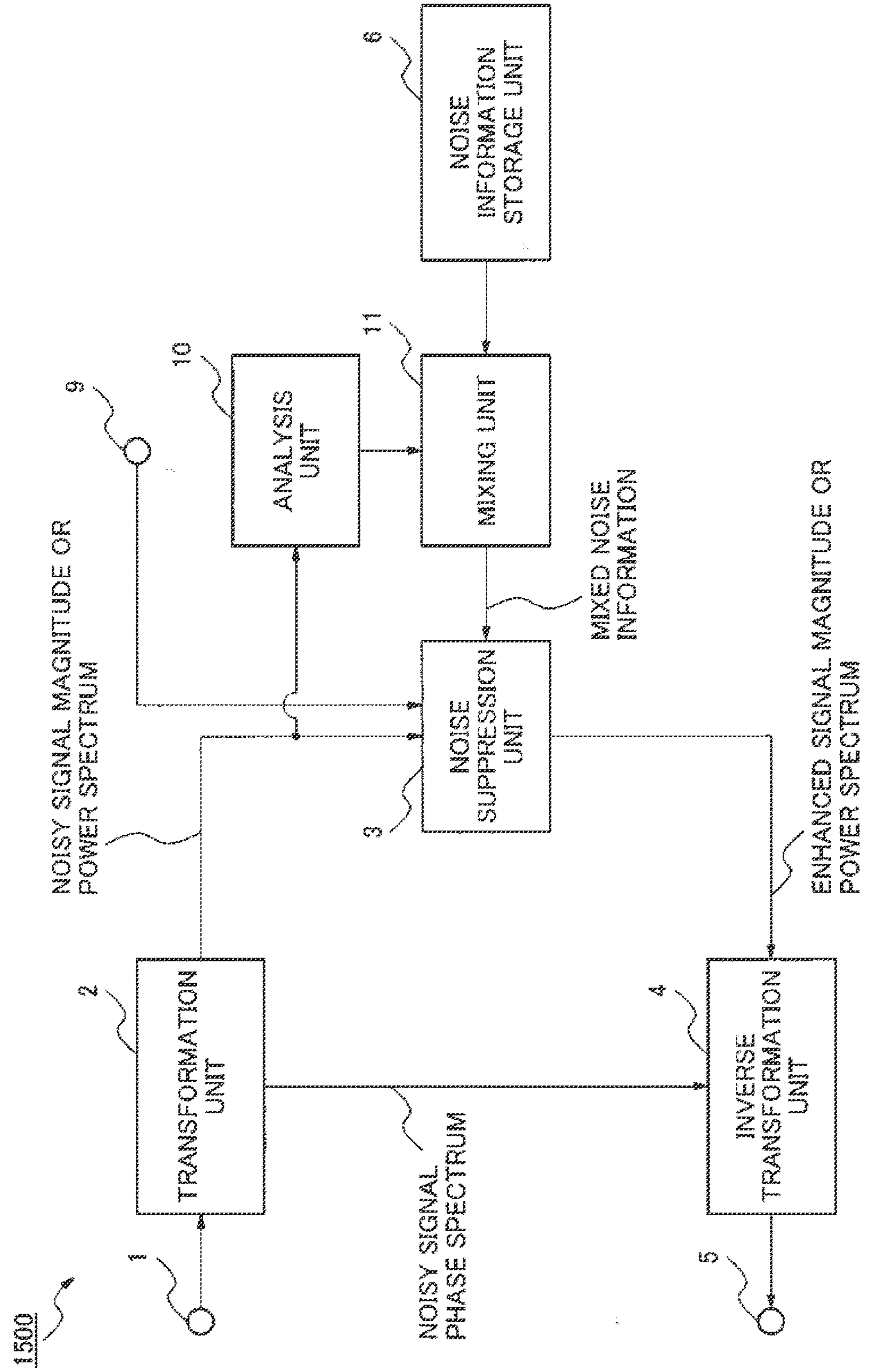
FIG. 15 is a block diagram showing a schematic configuration of a noise suppressing apparatus according to a tenth exemplary embodiment of the present invention.

The tenth exemplary embodiment of the present invention will be described using FIG. 15. To the noise suppression unit 3 included in a noise suppressing apparatus 1500 according to the tenth exemplary embodiment, information (noise existence information) which indicates whether specific noise exists in an inputted noisy signal or not is supplied from an input terminal 9. With this information, noise can be suppressed certainly when the specific noise exists. Because other structures and operations are the same as those of the first exemplary embodiment, description will be omitted here.

Eleventh Exemplary Embodiment

Figure 16:
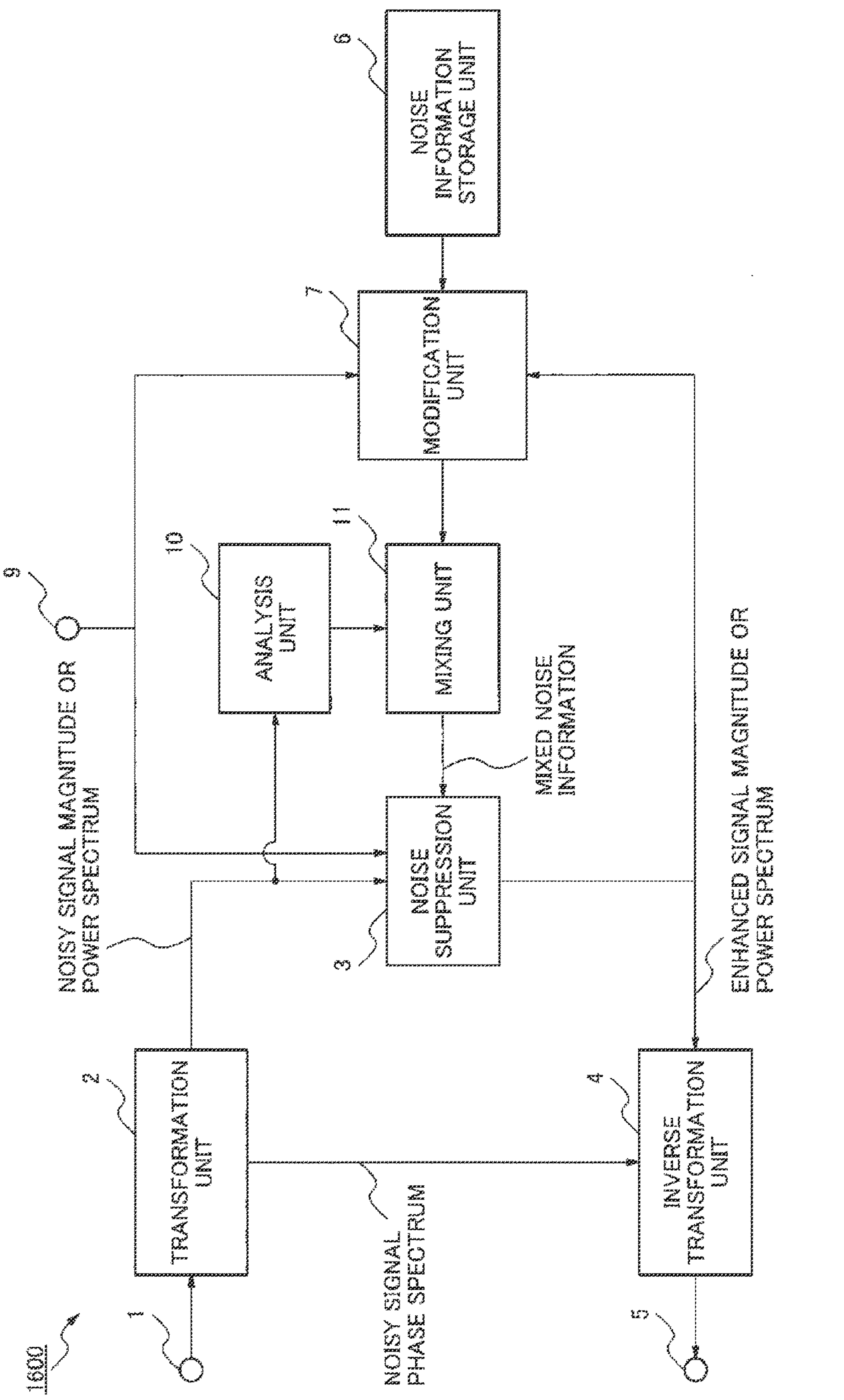
FIG. 16 is a block diagram showing a schematic configuration of a noise suppressing apparatus according to an eleventh exemplary embodiment of the present invention.

The eleventh exemplary embodiment of the present invention will be described using FIG. 16. To the noise suppression unit 3 and the modification unit 7 included in a noise suppressing apparatus 1600 according to the tenth exemplary embodiment, information (noise existence information) which indicates whether specific noise exists in an inputted noisy signal or not is supplied from the input terminal 9. With this information, when the specific noise exists, it is possible to certainly suppress the noise and, at the same time, update information for modification. Because other structures and operations are the same as those of the first exemplary embodiment, description will be omitted here. In addition, according to this exemplary embodiment, the information for modification is not updated when the specific noise does not exist. Therefore, the accuracy of noise suppression for the specific noise can be improved.

Twelfth Exemplary Embodiment

Figure 17:
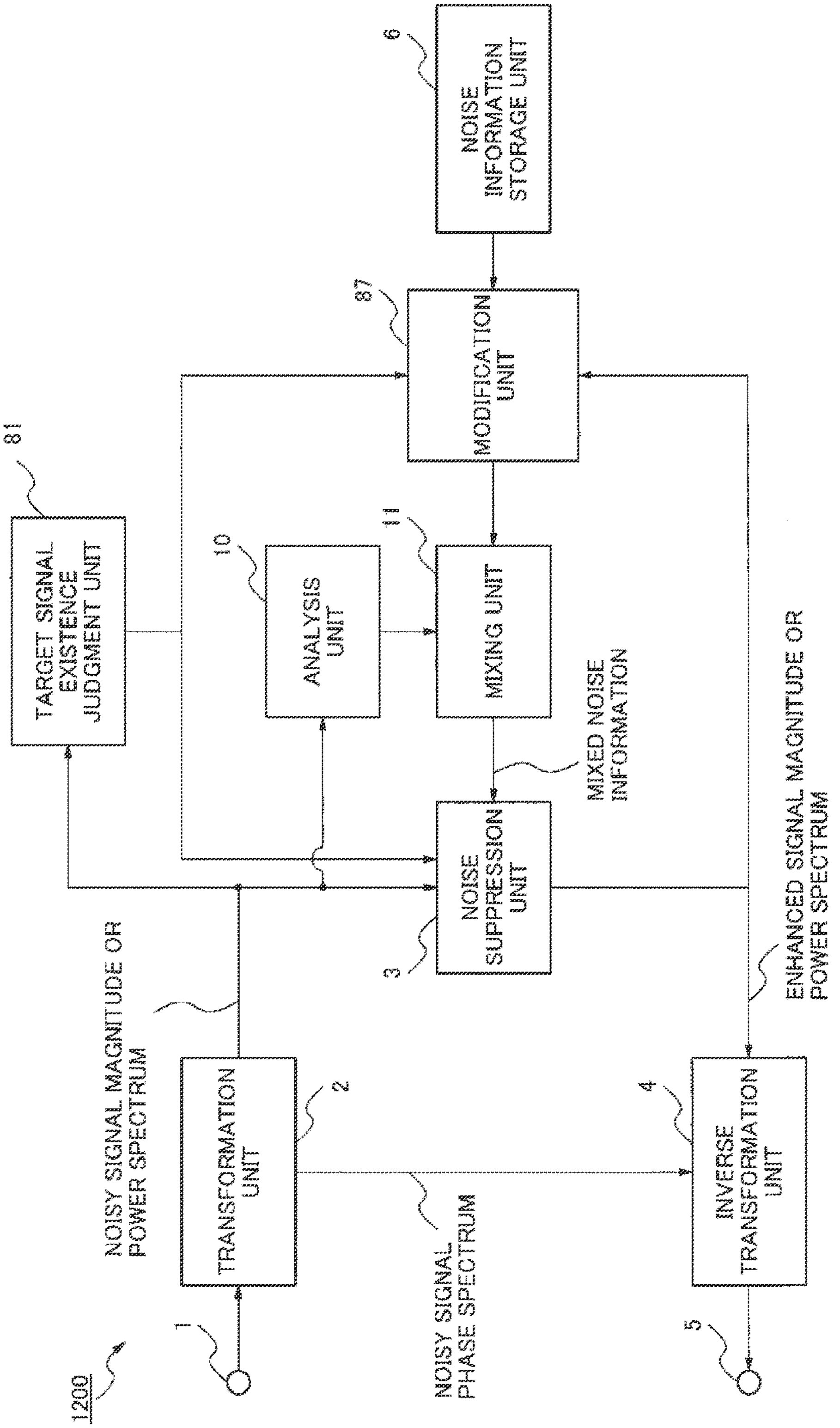
FIG. 17 is a block diagram showing a schematic configuration of a noise suppressing apparatus according to a twelfth exemplary embodiment of the present invention.

The twelfth exemplary embodiment of the present invention will be described using FIG. 17. A noise suppressing apparatus 1200 in this exemplary embodiment has a target signal existence judgment unit 81. A noisy signal magnitude spectrum from the transformation unit 2 is transmitted to the target signal existence judgment unit 81. The target signal existence judgment unit 81 analyzes the noisy signal magnitude spectrum and judges whether a target signal exists or not, or how much it exists.

A modification unit 87 updates the information for modification for modifying noise information based on the judgment result by the target signal existence judgment unit 81. For example, because, when there is no target signal, the noisy signal is entirely composed of noise, a suppression result by the noise suppression unit 3 should be zero. Accordingly, the modification unit 87 adjusts a scaling factor and the like so that a noise suppression result at that time should be zero.

On the other hand, when a target signal is included in the noisy signal, update of the information for modification in the modification unit 87 is performed according to the existence rate of the target signal. For example, when a target signal exists in the noisy signal with a rate of 10%, the information for modification is updated partially (by 90%).

According to this exemplary embodiment, because modification information is updated in proportion to the noise existence rate in the noisy signal, noise suppression result with much higher accuracy can be obtained consequently.

Other Embodiments

Although the first to twelfth exemplary embodiments described above have been described regarding noise suppressing apparatus each including a specific feature, a noise suppressing apparatus made by any combination of those features is also included within the category of the present invention.

The present invention may be applied to a system composed of a plurality of equipment or single equipment. Further, the present invention is also applicable in a case where a signal processing software program which realizes the functions of the exemplary embodiments is supplied to a system or equipment directly or remotely. Accordingly, a program installed in a computer in order to realize the functions of the present invention by a computer, a medium storing such a program and a WWW server storing the program for download are also included within the category of the present invention.

Figure 18:
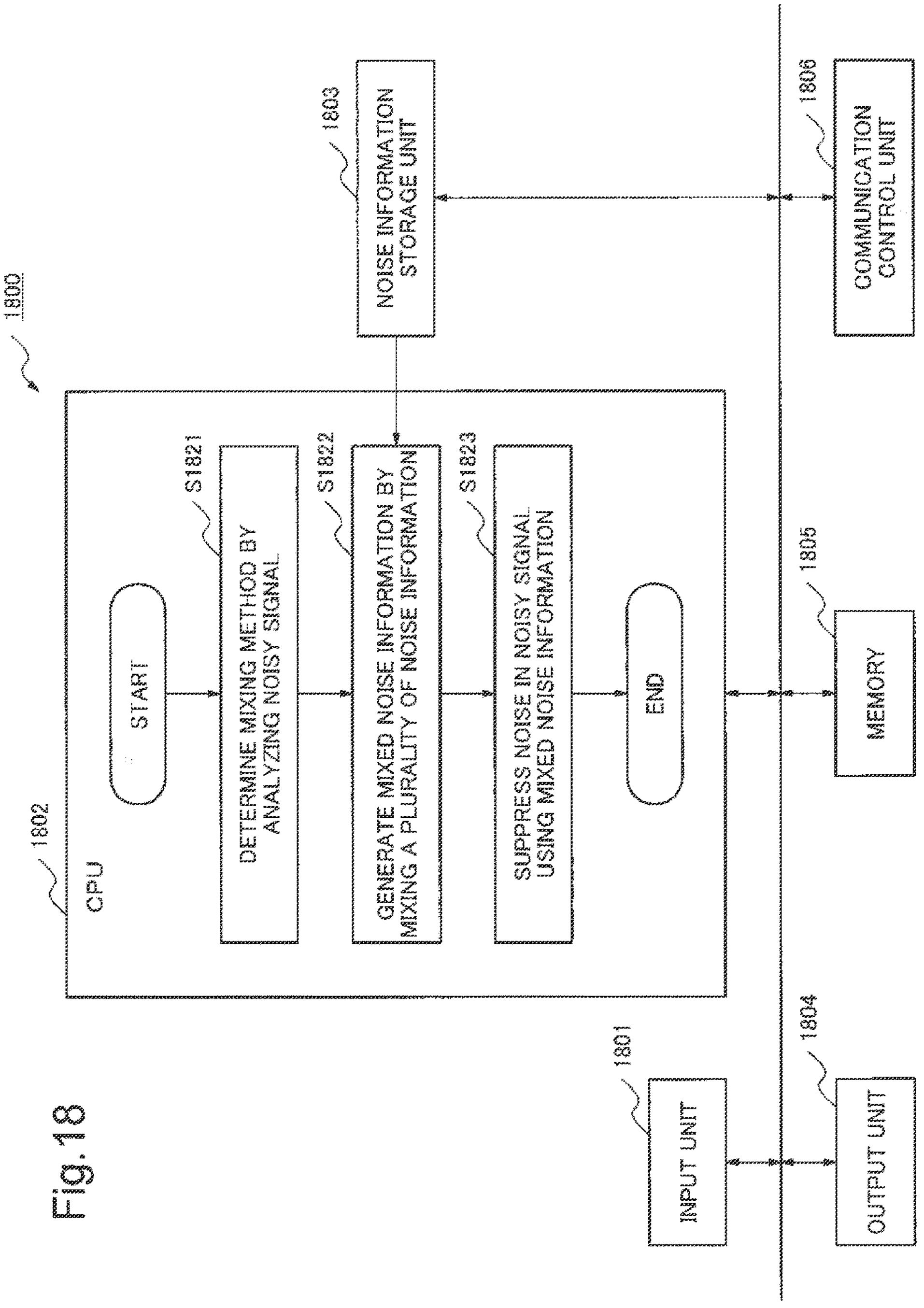
FIG. 18 is a schematic block diagram of a computer which executes a signal processing program according to another exemplary embodiment of the present invention.

FIG. 18 is a block diagram of a computer 1800 which executes a signal processing program when the first exemplary embodiment is formed by the signal processing program. The computer 1800 includes an input unit 1801, a CPU 1802, a noise information storage unit 1803, an output unit 1804, a memory 1805 and a communication control unit 1806.

By reading the signal processing program stored in the memory 1805, the CPU 1802 controls operations of the whole computer 1800. That is, the CPU 1802 that has executed the signal processing program analyzes a noisy signal and determines a mixing method (S1821). Next, the CPU 1802 mixes a plurality of noise information by the determined mixing method, and generates mixed noise information (S1822). At least one of the plurality of noise information to be mixed is information stored in the noise information storage unit 1803 in advance. Next, the CPU 1802 suppresses noise in the noisy signal using the mixed noise information (S1823), and completes the processing.

As a result, the same effect as the first exemplary embodiment can be obtained.

[Other Expressions of the Exemplary Embodiments]

Although part or all of the above-mentioned exemplary embodiments can also be described like the following supplementary notes, they are not limited to the followings.

(Supplementary Note 1)

A signal processing method, comprising, in order to suppress noise in a noisy signal, analyzing the noisy signal that is supplied as an input signal;

generating a mixed noise information by mixing a plurality of noise information about a noise to be suppressed based on the result of the analysis of the noisy signal; and suppressing the noise using the mixed noise information.

(Supplementary Note 2)

The signal processing method according to supplementary note 1, further comprising:

from the noise information stored in a memory in advance, generating said plurality of noise information to be mixed.

(Supplementary Note 3)

The signal processing method according to supplementary note 1 or 2, further comprising:

mixing as the noise information an average spectrum and a maximum spectrum of the noise to be suppressed to generate the mixed noise information.

(Supplementary Note 4)

The signal processing method according to supplementary note 1 or 2, further comprising:

mixing as the noise information an average spectrum, a maximum spectrum and a minimum spectrum of noise to be suppressed to generate the mixed noise information (Supplementary Note 5)

The signal processing method according to supplementary note 3 or 4, further comprising:

storing an average spectrum of the noise to be suppressed in a memory in advance; and generating the maximum spectrum from the average spectrum.

(Supplementary Note 6)

The signal processing method according to supplementary note 4, further comprising:

storing an average spectrum of the noise to be suppressed in a memory in advance; and generating the minimum spectrum from the average spectrum.

(Supplementary Note 7)

The signal processing method according to any one of supplementary notes 1 to 6, further comprising:

upon detection of a special component by analyzing the noisy signal, generating the mixed noise information by mixing, among frequency components of noise to be suppressed, the special component and basic components other than the special component with the noise information.

(Supplementary Note 8)

The signal processing method according to any one of supplementary notes 1 to 6, further comprising:

upon detection of a peak component by analyzing the noisy signal, generating the mixed noise information by mixing, among frequency components of noise to be suppressed, the peak component and basic components other than the peak component with the noise information.

(Supplementary Note 9)

The signal processing method according to any one of supplementary notes 1 to 8, further comprising:

generating the mixed noise information by multiplying each of a plurality of noise information to be mixed by a coefficient according to an analysis result of the noisy signal, and then mixing each product of a coefficient and the plurality of noise information.

(Supplementary Note 10)

The signal processing method according to any one of supplementary notes 1 to 9, further comprising:

storing special noise information including a special spectrum shape in a memory in advance;

by analysis of the noisy signal, evaluating a similarity degree between the special noise information and an input noisy signal; and upon detection of a high similarity degree, mixing the special noise information to generate the mixed noise information.

(Supplementary Note 11)

The signal processing method according to supplementary note 10, wherein the special noise information is impact noise information.

(Supplementary Note 12)

The signal processing method according to any one of supplementary notes 1 to 11, further comprising:

modifying the noise information based on a noise suppression result.

(Supplementary Note 13)

The signal processing method according to supplementary note 12, further comprising:

modifying the noise information by multiplying the noise information by a scaling factor corresponding to a noise suppression result.

(Supplementary Note 14)

The signal processing method according to supplementary note 12 or 13, further comprising:

modifying the noise information by introducing an offset according to the noise suppression result.

(Supplementary Note 15)

The signal processing method according to any one of supplementary notes 12 to 14, further comprising:

based on a result of analyzing a noise suppression result, modifying each of a plurality of noise information to be a mixed.

(Supplementary Note 16)

The signal processing method according to any one of supplementary notes 1 to 15, further comprising: supplying information about noise presence in said noisy signal; and, upon the presence of the noise in the noisy signal, suppressing the noise.

(Supplementary Note 17)

The signal processing method according to any one of supplementary notes 1 to 16, further comprising:

by analyzing the noisy signal, determining how much target signal exists in the noisy signal and suppressing the noise based on the determination result.

(Supplementary Note 18)

An information processing apparatus, comprising:

an analysis means for analyzing a supplied noisy signal;

a mixing means for mixing a plurality of noise information about noise to be a suppressed according to a result of analysis of the noisy signal to generate mixed noise information; and a noise suppression means for suppressing the noise using the mixed noise information.

(Supplementary Note 19)

A signal processing program to make a computer execute:

an analysis process of analyzing a supplied noisy signal;

a mixing process of mixing a plurality of noise information about noise to be suppressed according to a result of analysis of the noisy signal to generate mixed noise information; and a noise suppression process of suppressing the noise using the mixed noise information.

Although the present invention has been described with reference to the exemplary embodiments above, the present invention is not limited to the above-mentioned exemplary embodiments. Various modifications which a person skilled in the art can understand can be performed in the composition and details of the present invention within the scope of the present invention.

This application is based upon and claims the benefit of priority from Japanese patent application No. 2010-118842, filed on May 24, 2010, the disclosure of which is incorporated herein in its entirety by reference.

The invention claimed is:

1. A signal processing method, comprising:

analyzing a noisy signal that is supplied as an input signal;

generating mixed noise information by mixing a plurality of noise information about a noise to be suppressed based on a result of said analyzing of the noisy signal, wherein the plurality of noise information is stored in advance of said analyzing; and suppressing said noise using said mixed noise information.

2. The signal processing method according to claim 1, further comprising:

from said noise information stored in a memory in advance, generating said plurality of noise information to be mixed.

3. The signal processing method according to claim 1, further comprising:

mixing as said noise information an average spectrum and a maximum spectrum of said noise to be suppressed to generate said mixed noise information.

4. The signal processing method according to claim 1, further comprising:

mixing as said noise information an average spectrum, a maximum spectrum and a minimum spectrum of said noise to be suppressed to generate said mixed noise information.

5. The signal processing method according to claim 3, further comprising:

storing an average spectrum of said noise to be suppressed in a memory in advance; and generating said maximum spectrum from said average spectrum.

6. The signal processing method according to claim 4, further comprising:

storing an average spectrum of said noise to be suppressed in a memory in advance; and generating said minimum spectrum from said average spectrum.

7. The signal processing method according to claim 1, further comprising:

upon detection of a special component by analyzing said noisy signal, generating said mixed noise information by mixing, among frequency components of noise to be suppressed, said special component and basic components other than said special component with said noise information.

8. The signal processing method according to a claim 1, further comprising:

upon detection of a peak component by analyzing said noisy signal, generating said mixed noise information by mixing, among frequency components of noise to be suppressed, said peak component and basic components other than said peak component with said noise information.

9. The signal processing method according to claim 1, further comprising:

generating said mixed noise information by multiplying each of a plurality of noise information to be a mixed by a coefficient according to an analysis result of said noisy signal, and then mixing each product of a coefficient and said plurality of noise information.

10. The signal processing method according to claim 1, further comprising:

storing special noise information including a special spectrum shape in a memory in advance;

by analysis of said noisy signal, evaluating a similarity degree between said special noise information and said input noisy signal; and upon detection of a high similarity degree being high, mixing said special noise information to generate said mixed noise information.

11. The signal processing method according to claim 10, wherein said special noise information is impact noise information.

12. The signal processing method according to claim 1, further comprising:

modifying said noise information based on a noise suppression result.

13. The signal processing method according to claim 12, further comprising:

modifying said noise information by multiplying said noise information by a scaling factor corresponding to a noise suppression result.

14. The signal processing method according to claim 12, further comprising:

modifying said noise information by introducing an offset according to said noise suppression result.

15. The signal processing method according to claim 12, further comprising:

based on a result of analyzing a noise suppression result, modifying each of a plurality of noise information to be mixed.

16. The signal processing method according to claim 1, further comprising:

supplying information about noise presence in a noisy signal; and, upon the presence of said noise existing in said noisy signal, suppressing said noise.

17. The signal processing method according to claim 1, further comprising:

by analyzing said noisy signal, determining how much target signal exists in said noisy signal and suppressing said noise based on said determination.

18. An information processing apparatus, comprising:

a memory storing instructions; and one or more processors configured to process the instructions to:

analyze a supplied noisy signal;

mix a plurality of noise information about noise to be suppressed according to an analysis result of said noisy signal to generate mixed noise information, wherein the plurality of noise information is stored in advance of said analyzing; and suppress said noise using said mixed noise information.

19. A non-transitory computer-readable medium storing a program to make a computer execute a process, comprising:

analyzing a supplied noisy signal;

mixing a plurality noise of information about a noise to be suppressed according to an analysis result of said noisy signal to generate mixed noise information, wherein the plurality of noise information is stored in advance of said analyzing; and suppressing said noise using said mixed noise information.

* * * * *